United States Patent
Lean et al.

(10) Patent No.: US 7,680,928 B2
(45) Date of Patent: *Mar. 16, 2010

(54) METHODS AND SYSTEMS FOR AUTOMATICALLY CONFIGURING NETWORK MONITORING SYSTEM

(75) Inventors: Yoogin Lean, Apex, NC (US); David Wayne Minnich, Durham, NC (US); Kevin Allen Sapp, Apex, NC (US); Richard James Spangler, Raleigh, NC (US); Merl Allen Trimmer, Jr., Cary, NC (US)

(73) Assignee: Tekelec, Morrisville, NC (US)

( * ) Notice: Subject to any disclaimer, the term of this patent is extended or adjusted under 35 U.S.C. 154(b) by 482 days.

This patent is subject to a terminal disclaimer.

(21) Appl. No.: 11/638,322

(22) Filed: Dec. 13, 2006

(65) Prior Publication Data

US 2007/0124464 A1   May 31, 2007

Related U.S. Application Data

(62) Division of application No. 10/154,309, filed on May 23, 2002, now Pat. No. 7,155,512.

(60) Provisional application No. 60/293,328, filed on May 23, 2001.

(51) Int. Cl.
 G06F 15/173  (2006.01)
 H04L 12/28  (2006.01)
(52) U.S. Cl. .................. 709/224; 379/133; 370/250
(58) Field of Classification Search ........... 370/352, 370/428, 250; 379/32.05, 9.03, 112.04, 134, 379/115.01, 32.03, 133; 714/724; 455/423; 709/224

See application file for complete search history.

(56) References Cited

U.S. PATENT DOCUMENTS

| 5,008,929 A | 4/1991 | Olsent et al. |
| 5,438,570 A | 8/1995 | Karras et al. |

(Continued)

FOREIGN PATENT DOCUMENTS

EP   0 991 251 A2   9/1999

(Continued)

OTHER PUBLICATIONS

Supplemental European Search Report for PCT/US0216222 dated Aug. 4, 2006.

(Continued)

*Primary Examiner*—Jungwon Chang
(74) *Attorney, Agent, or Firm*—Jenkins, Wilson, Taylor & Hunt, P.A.

(57) ABSTRACT

An automatically configurable network monitoring system includes a network monitoring communications protocol used for communications between a network monitoring client executing on a routing node (100) being monitored and a network monitoring server executing on a network monitoring processor (106). According to the network monitoring communications protocol, the network monitoring client broadcasts a network monitoring service request message to the network monitoring servers. The service request message identifies a signaling link for which network monitoring service is being requested. The network monitoring servers provisioned to the requested provide network monitoring service respond affirmatively and thereby automatically grant network monitoring service. The network monitoring system may be completely probeless or, alternatively, used in conjunction with probe-based network monitoring devices.

10 Claims, 22 Drawing Sheets

U.S. PATENT DOCUMENTS

| | | | |
|---|---|---|---|
| 5,592,530 A * | 1/1997 | Brockman et al. | 379/32.03 |
| 5,809,286 A | 9/1998 | McLain, Jr. et al. | |
| 5,867,558 A * | 2/1999 | Swanson | 379/9.03 |
| 5,889,954 A | 3/1999 | Gessel et al. | |
| 5,966,431 A * | 10/1999 | Reiman et al. | 379/115.01 |
| 5,987,334 A | 11/1999 | Kaku et al. | |
| 6,028,914 A | 2/2000 | Lin et al. | |
| 6,085,244 A | 7/2000 | Wookey et al. | |
| 6,118,936 A | 9/2000 | Lauer et al. | |
| 6,122,255 A | 9/2000 | Bartholomew et al. | |
| 6,137,806 A * | 10/2000 | Martinez | 370/428 |
| 6,167,446 A | 12/2000 | Lister et al. | |
| 6,327,350 B1 | 12/2001 | Spangler et al. | |
| 6,359,976 B1 | 3/2002 | Kalyanpur et al. | |
| 6,381,306 B1 | 4/2002 | Lawson et al. | |
| 6,393,113 B1 | 5/2002 | Karras et al. | |
| 6,400,813 B1 | 6/2002 | Birnhak et al. | |
| 6,453,028 B1 * | 9/2002 | Ganesh | 379/112.04 |
| 6,483,842 B1 | 11/2002 | Mauger et al. | |
| 6,501,950 B1 * | 12/2002 | Smith et al. | 455/423 |
| 6,522,629 B1 | 2/2003 | Anderson, Sr. | |
| 6,539,082 B1 | 3/2003 | Lowe et al. | |
| 6,574,214 B1 | 6/2003 | Khalil et al. | |
| 6,765,990 B2 * | 7/2004 | Freedman et al. | 379/32.05 |
| 7,117,411 B2 * | 10/2006 | McNeely et al. | 714/724 |
| 7,155,512 B2 | 12/2006 | Lean et al. | |
| 7,304,984 B2 * | 12/2007 | Butler et al. | 370/352 |
| 2001/0028706 A1 * | 10/2001 | Nolting | 379/134 |
| 2001/0038689 A1 | 11/2001 | Liljestrand et al. | |
| 2002/0118813 A1 | 8/2002 | Brehm et al. | |
| 2002/0126653 A1 * | 9/2002 | Vasarainen | 370/352 |
| 2002/0150221 A1 | 10/2002 | Carson et al. | |
| 2003/0128698 A1 | 7/2003 | Darland et al. | |

FOREIGN PATENT DOCUMENTS

| | | |
|---|---|---|
| WO | WO 98/33303 | 7/1998 |
| WO | WO 01/31936 A2 | 5/2001 |
| WO | WO 02/095580 A1 | 11/2002 |

OTHER PUBLICATIONS

Commonly-assigned, co-pending U.S. Appl. No. 10/154,309 for "Method and Systems for Automatically Configuring Network Monitoring System," (Unpublished, filed May 23, 2002).

Notice of Allowance and Fee(s) Due for U.S. Appl. No. 10/154,309 (Oct. 23, 2006).

Proceeding further with the European patent application pursuant to Article 96(1) and Rule 51(1) EPC for European Application No. 02737089.9 (Aug. 23, 2006).

Official Action for U.S. Appl. No. 10/154,309 (Mar. 6, 2006).

Restriction Requirement for U.S. Appl. No. 10/154,309 (Oct. 3, 2005).

Notification of Transmittal of the International Search Report or Declaration for International Application No. PCT/US02/16222 (Aug. 7, 2002).

Communication pursuant to Article 94(3) EPC for European application No. 02737089.9 (Jul. 7, 2009).

* cited by examiner

| Octet | |
|---|---|
| 'E' (0x45) | 1 |
| 'S' (0x53) | 2 |
| 'F' (0x46) | 3 |
| 'S' (0x53) | 4 |
| Service Accept (0x82) | 5 |
| Message Length (MSB) | 6 |
| Message Length (LSB) | 7 |
| NMCP version (MSB) | 8 |
| NMCP version (LSB) | 9 |
| Service Mode | 10 |
| Transaction ID | 11 |
| Number of Responses | 12 |
| IP Address (MSB) | 13 |
| IP Address (octet 2) | 14 |
| IP Address (octet 3) | 15 |
| IP Address (LSB) | 16 |
| TCP Port (MSB) | 17 |
| TCP Port (LSB) | 18 |

FIG. 14

METHODS AND SYSTEMS FOR AUTOMATICALLY CONFIGURING NETWORK MONITORING SYSTEM

RELATED APPLICATIONS

This application is a divisional of U.S. patent application Ser. No. 10/154,309 filed on May 23, 2002 (now U.S. Pat. No. 7,155,512), which claims the benefit of U.S. Provisional Patent Application No. 60/293,328, filed May 23, 2001, the disclosures of which are incorporated herein by reference in their entireties.

TECHNICAL FIELD

The present invention relates to network monitoring system. More particularly, the present invention relates to a methods and systems for automatically configuring a network monitoring system.

BACKGROUND ART

In telecommunications signaling networks, network monitoring systems are used to perform various functions, such as call tracing, billing, billing verification, fraud detection, protocol verification, etc. In order to perform these functions, network monitoring devices copy signaling messages from signaling links and process these messages into a useful format, such as a transaction record. One conventional method for copying signaling messages is to place link probes on signaling links connected to signaling message routing nodes, such as signal transfer points. The link probes are typically connected to a monitoring unit that processes the copied signaling messages.

One disadvantage of using link probes and an external monitoring unit to copy and process signaling messages is that these devices take up space in telecommunications network facilities. Since these facilities are often located in urban buildings where space expensive, using external link probes and monitoring units may be undesirable.

In order to reduce the space required to perform network monitoring functions, hybrid network monitoring systems have been developed. These hybrid monitoring systems typically involve a copy function located within a routing node for copying signaling messages, one or more computers outside of the routing node for processing the signaling messages, and external link probes and monitoring devices for some of the signaling links connected to the routing node. Because the copy function is located within the routing node, the need for external link probes is reduced. However, even these hybrid systems required some external link probes to capture all of the signaling messages received by or sent from the routing node being monitored.

One disadvantage of conventional network monitoring systems is that these systems must be manually configured to match the configuration of the routing node being monitored. For instance, signaling links connected to signal transfer points are taken in and out of service on a daily basis. The monitoring system, in both the hybrid and probe-based cases, must be manually reconfigured each time the configuration of the network being monitored changes. When a link is taken out of service, the monitoring system must be reconfigured to cease monitoring the out of service link. When a new link is put in service, the monitoring system must be reconfigured to monitor the new link.

Adding a signaling link to a signal transfer point typically includes adding a new printed circuit board to the signal transfer point and connecting the printed circuit board to an external cable. In the probe-based case, re-configuring the network monitoring system includes attaching a new link probe to the cable and programming the monitoring unit to recognize signaling messages on the new signaling link. For hybrid network monitoring systems that include internal and external link monitors, both new link probes and internal signaling message copy functions may require modification. Such manual reconfiguration is both time and labor intensive and often results in the network monitoring system being out of sync with the network being monitored.

In light of the difficulties associated with conventional network monitoring systems, there exists a long felt need a network monitoring system with reduced configuration time.

DISCLOSURE OF THE INVENTION

The present invention includes methods and systems for automatically configuring a network monitoring system. According to one aspect, an automatically configurable network monitoring system includes a plurality of link interface modules associated with external signaling links. When a link interface module in a routing node boots up and begins to service a signaling link, the link interface module requests network monitoring service from a group of network monitoring applications. The network monitoring applications are pre-associated with subsets of the total set of signaling links that could be serviced by with the routing node. The network monitoring application associated with the link interface module accepts requesting service the request. A network monitoring session is established between the link interface module and the network monitoring application. The link interface module sends signaling messages copied from the signaling link over the session. If the link interface module is taken out of service, the network monitoring session ends and resources on a network monitoring processor on which the network monitoring application executes previously dedicated to the link interface module are available to monitor other signaling links. Because a network monitoring system according to the present invention automatically adapts itself to monitor new signal links and to cease monitoring signaling links that are taken out of service, the amount of labor required to reconfigure a network monitoring system is greatly reduced over conventional network monitoring configuration methods.

Accordingly, it is an object of the present invention to provide an automatically configurable network monitoring system.

It is another object of the invention to provide a method for automatically configuring a network monitoring system.

It is another object of the invention to provide a completely probeless network monitoring system.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings, of which:

FIG. 14 is a message format diagram illustrating an exemplary format for a service accept message suitable for use by embodiments of the present invention;

DETAILED DESCRIPTION OF THE INVENTION

System Overview

Figure 1:
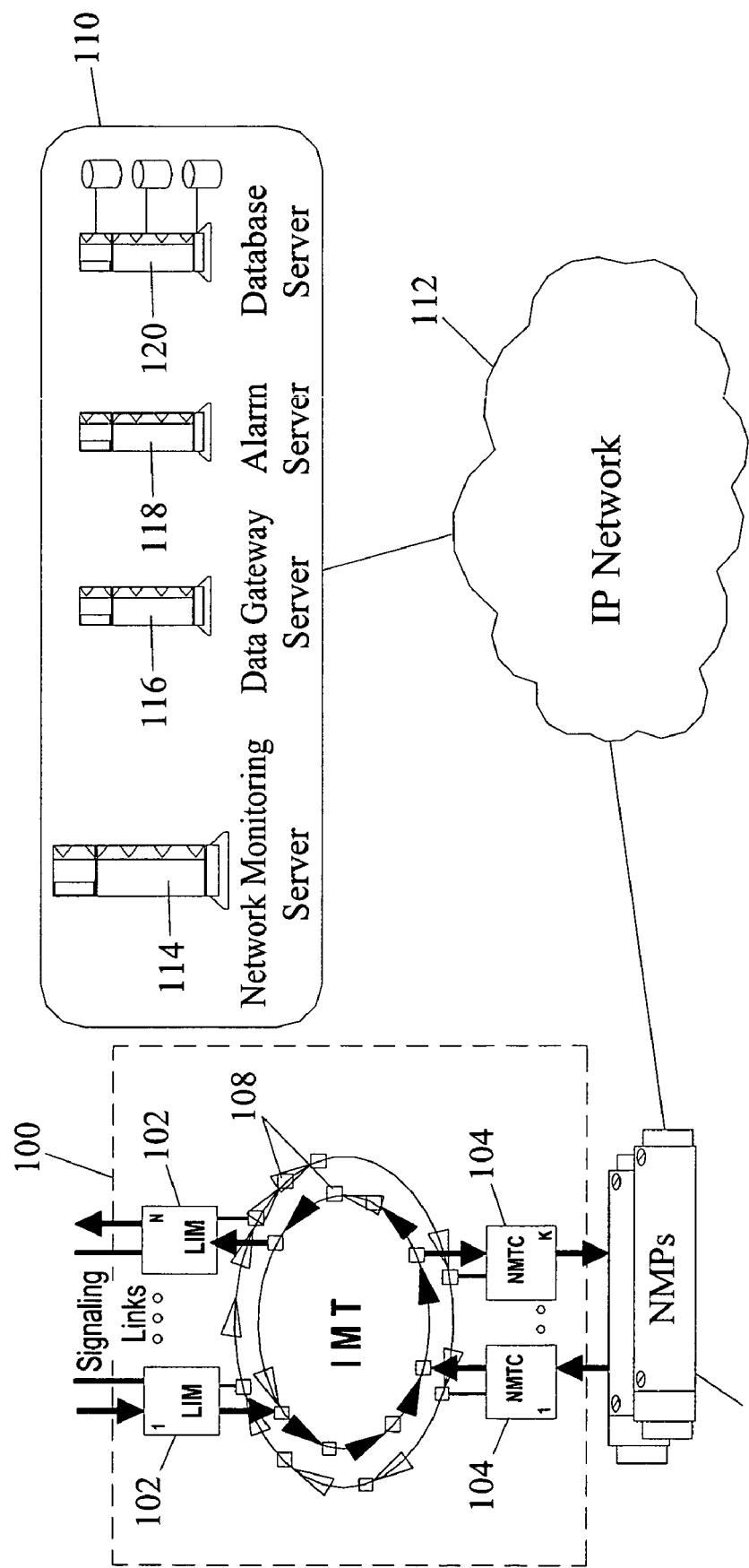
FIG. 1 is a block diagram of an automatically configurable network monitoring system according to an embodiment of the present invention.

In one embodiment, an automatically configurable network monitoring system according to the present invention may integrated within a network routing node, such as a signal transfer point or an SS7/IP gateway. FIG. 1 illustrates an exemplary architecture for an integrated automatically configurable network monitoring system according to an embodiment of the present invention. In FIG. 1, reference numeral 100 represents a routing node, such as an STP or an SS7/IP gateway. Routing node 100 includes a plurality of link interface modules (LIMs) 102 that send and receive SS7 messages via SS7 signaling links. Although not illustrated in FIG. 1, routing node 100 may also include data communication modules (DCMs) for sending and receiving IP messages via IP signaling links. Network monitoring transport cards (NMTCs) 104 route messages between LIMs 102 and network monitoring processors (NMPs) 106. LIMs 102 and NMTCs 104 are connected via IMT buses 108. NMPs 106 buffer MSUs and alarm messages received from routing node 100.

From a software perspective, LIMs 102 include TCP/IP protocol stack software for establishing TCP/IP connections with NMPs 106 through NMTCs 104, network monitoring client software for requesting network monitoring services from NMPs 106, MSU copy functions for copying incoming and outgoing MSUs, and SS7 alarm functions for generating alarm notifications when certain events, such as signaling link failures, occur. LIMs 102 encapsulate MSUs and alarm notifications in specialized packets that indicate the source of the MSUs or alarm messages. LIMs 102 also communicate provisioning information to NMPs 106 to enable automatic configuration of NMPs 106 when a signaling link is added or deleted.

NMPs 106 execute server software that responds to service requests from LIMs 102. The server software on each NMP 106 may be associated with a predetermined set of signaling links. For example, server software on NMP 106 may be provisioned to handle signaling links 0-31 and server software on another NMP 106 may be provisioned to handle signaling links 32-63 in a routing node wired for 64 total possible signaling links, even if the routing node is not equipped for 64 links. As used herein, the term "equipped link" refers to a signaling link for which a link interface module is present in a routing node and in service. The term "wired link" refers to a link in a routing node for which no link interface card is present but wiring for such a card is present. A wired link becomes an equipped link when a link interface module is plugged into the corresponding card slot.

Because network monitoring processors 106 include software that is pre-provisioned to service all of the links in a routing node, regardless of whether the links are wired or equipped, network monitoring processors 106 automatically adapt to changes in configuration of the routing node. For example, as will be explained in detail below, when a LIM boots up with the network monitoring client software enabled, the LIM broadcasts a service request message to network monitoring processors 106. The server software on NMPs 106 provisioned to handle the request for that particular LIM responds to the request. If the response is a service acceptance, the requesting LIM establishes a TCP/IP connection with the responding server and begins sending network monitoring messages to the server. The server on NMP 106 receives and buffers the received messages.

NMPs 106 communicate with a server farm 110 via IP network 112. In the illustrated example, server farm 112 includes a network monitoring server 114, a data gateway server 116, an alarm server 118, and a database server 120. Network monitoring server 114 performs the following functions: real time signaling link status reporting, real time signaling link state reporting, real time protocol analysis, such as call tracing, filtering, and decoding, traffic report generation, CDR generation and real time event reporting. Data gateway server 116 receives MSU fragments, formats the MSU fragments into CDRs and sends the CDRs to applications, such as fraud detection applications, billing verification applications, etc. Alarm server 118 collects event message reports and other events that report signaling link errors and displays alarms to the user. Database server 120 is connected to network monitoring server 114. Network monitoring server 114 generates predefined traffic reports in flat ASCII format. Some end users may desire to generate customized traffic reports. Hence, database server 120 stores the data collected by network monitoring server 114 in a database, such as an Oracle database. A database front end, such as Crystal Reports available from Seagate Software may be used along with database server 120 to generated customized reports.

System Hardware and Physical Configuration

Figure 2:
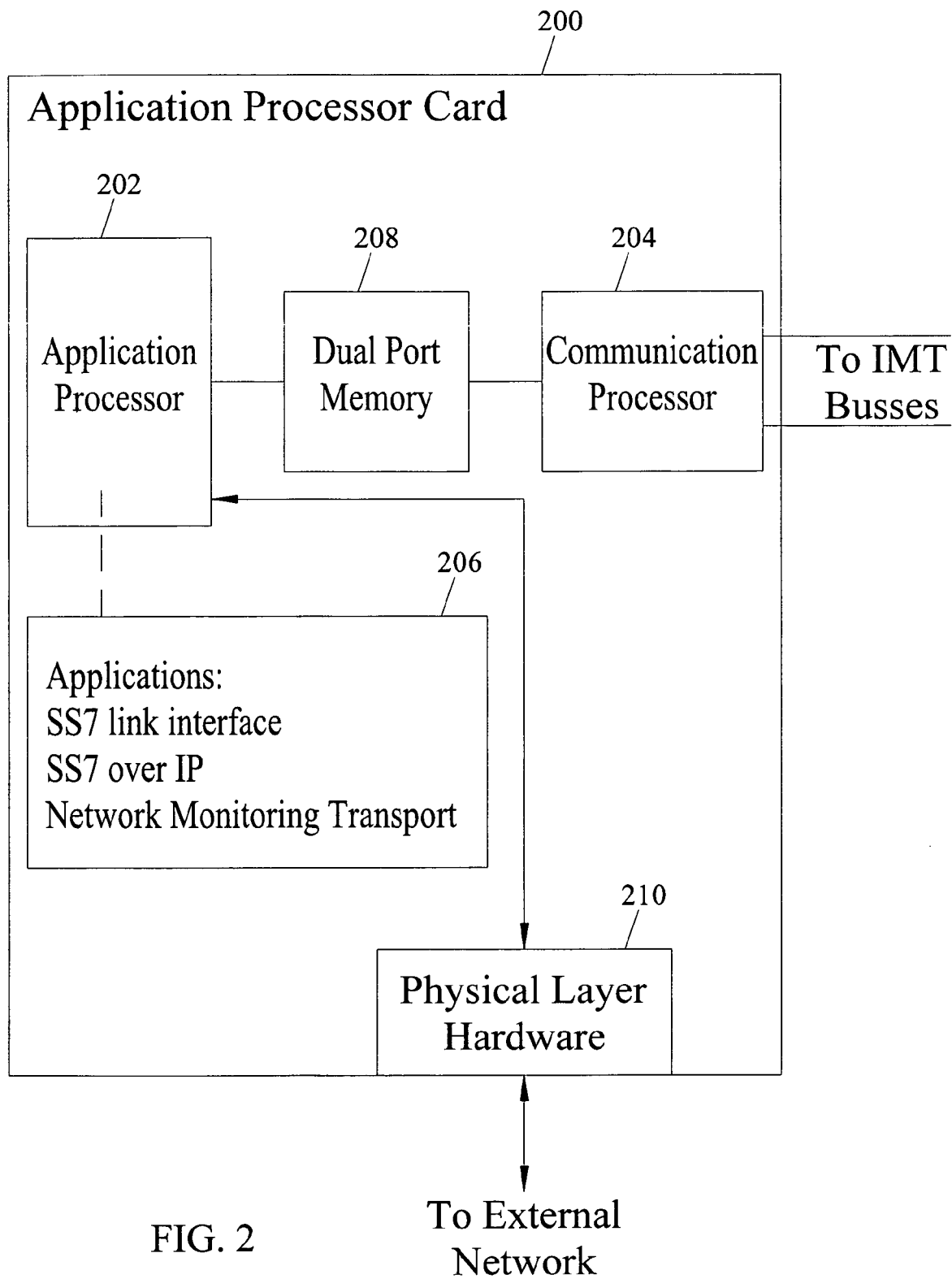
FIG. 2 is a block diagram of a processing module including exemplary hardware suitable for use in an automatically configurable network monitoring system according to an embodiment of the present invention.

From a hardware perspective, each LIM 102 and NMTC 104 may be implemented using an application processor card. FIG. 2 illustrates an example of an application processor card suitable for use as LIMs 102 and NMTCs 104. In FIG. 2, application processor card 200 includes an application processor 202 and a communication processor 204. Application processor 202 may be a general purpose microprocessor that executes one or more application programs. In the illustrated example, application programs 206 that execute on application processor 202 may include an SS7 link interface applications in the case where application processor card 200 functions an SS7 link interface module, an SS7 over IP application in the case where application processor card 200 functions as an SS7/IP conversion module, or a network monitoring transport application in the case where application processor card 200 functions as a network monitoring transport card.

Communication processor 204 may be a microprocessor programmed to send and receive message via buses 108. A dual port memory 208 is shared by application processor 202 and communication processor 204. For example, when application processor 202 wishes to send a message via buses 108, application processor 202 may write the message into dual port memory 208. Communication processor 204 may read the message from dual port memory 208 and place the message on one of buses 108. Application processor card 200 may also include physical layer hardware 210 for interfacing with an external network. For example, physical layer hardware 210 may include electrical or optical interface physical layer and framer chips for sending and receiving bits to and from an external network.

Figure 3:
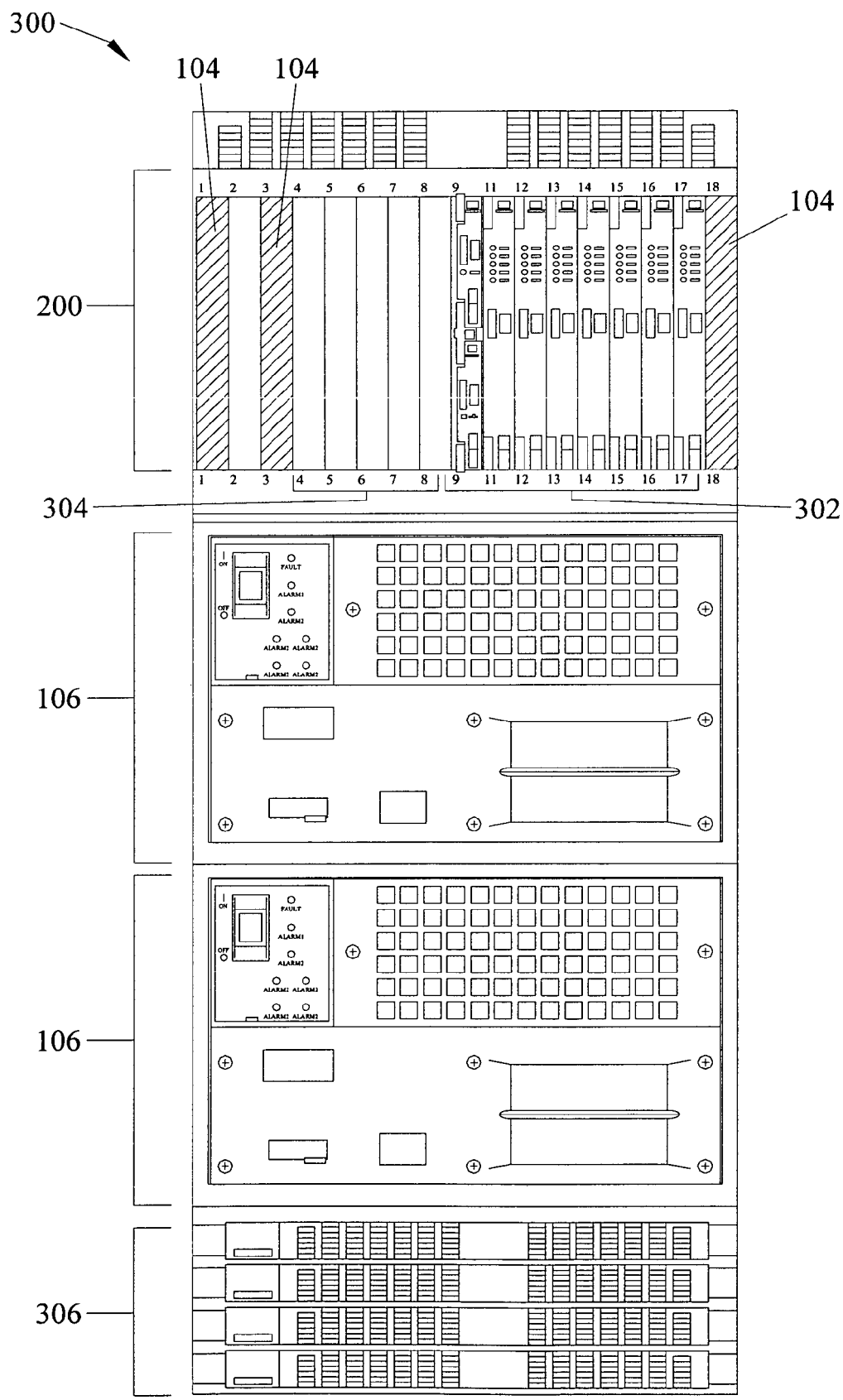
FIG. 3 is a schematic diagram of a telecommunications equipment frame including an automatically configurable network monitoring system according to an embodiment of the present invention.

Network monitoring processors 106 illustrated in FIG. 1 may be implemented using application processor cards, such as application processor card 200 illustrated in FIG. 2. However, because network monitoring processors 106 are likely to receive a high volume of network monitoring traffic from many different application processor cards, network monitoring processors 106 are preferably configured to receive these messages via a different medium than buses 108 in order to avoid congestion on buses 108. FIG. 3 illustrates an embodiment of the present invention in which network monitoring processors 106 are implemented as rack-mountable general purpose computers connected to network monitoring transport cards 104 via one or more switches or hubs. In FIG. 3, a telecommunications equipment frame 300 may include racks or shelves for carrying application processor cards 200, network monitoring processors 106, and interconnecting switches and routers.

In the illustrated example, application processor cards 200 are located on a first shelf of frame 300. Application processor cards may include network monitoring transport cards 104, other cards 302, and one or more empty card slots 304. Other cards 302 may be any type of application processor cards, including SS7 link interface modules for sending and receiving messages via external SS7 signaling links, SS7/IP data communication modules for sending and receiving SS7 messages over an IP network, or database service modules for performing database-related functions, such as global title and number portability translations.

Network monitoring processors 106 are located in the next two racks of equipment frame 300. In the illustrated example, network monitoring processors 106 are rack mountable general purpose computers. An example of a rack mountable general purpose computer suitable for use as network monitoring processors 106 is the Netra T1 DC200 available from SUN Microsystems. Network monitoring processors 106 are preferably configured as a N+1 redundant configuration for reliability purposes.

Figure 4:
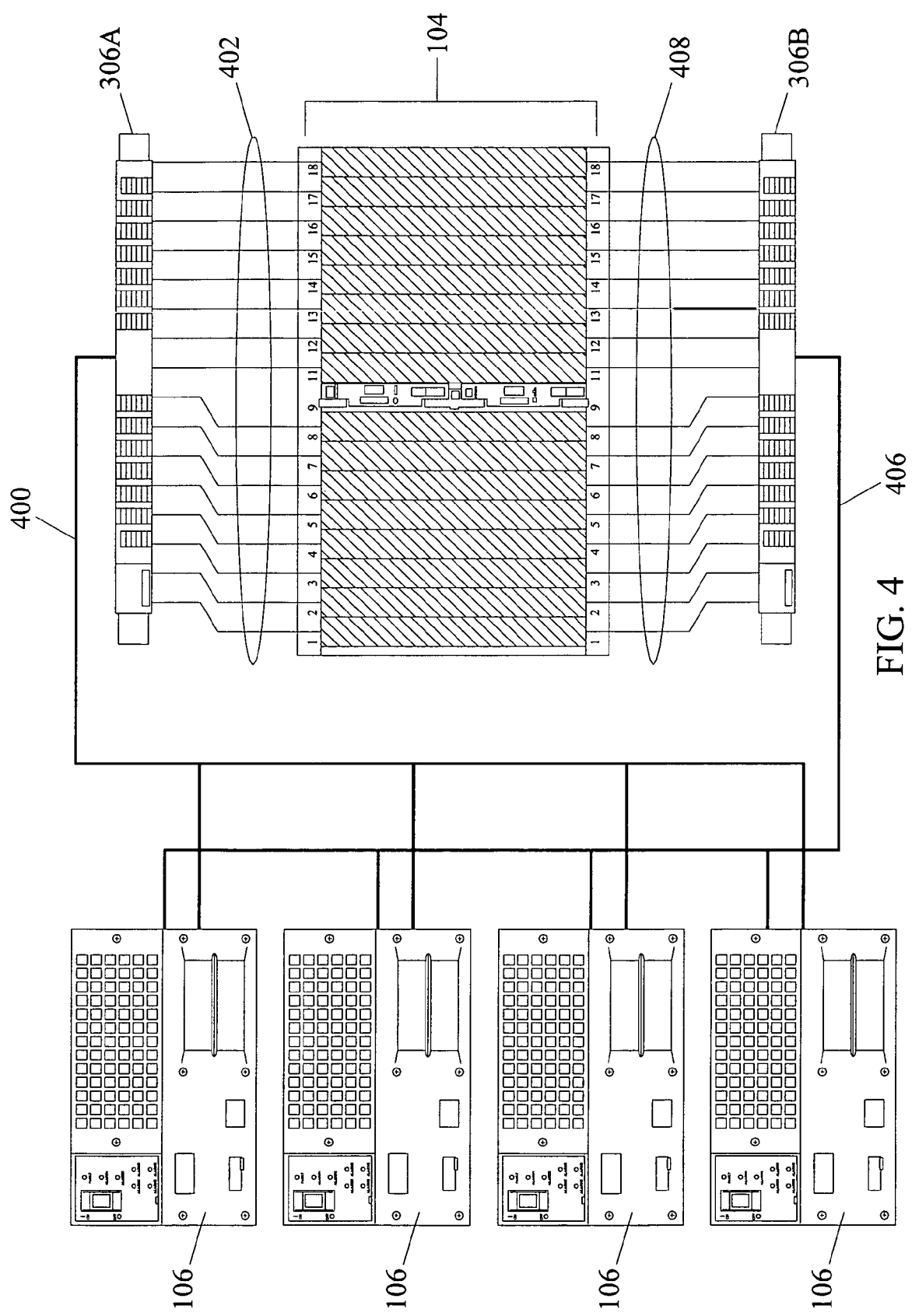
FIG. 4 is a schematic diagram of a plurality of network monitoring processors connected via an Ethernet according to an embodiment of the present invention.

Switches 306 redundantly connect network monitoring processors 106 to network monitoring transport cards 106. For example, in a preferred embodiment of the invention, switches 306 comprises Ethernet switches for connecting network monitoring processors 106 with network monitoring transport cards 104 via redundant Ethernet connections. FIG. 4 illustrates in more detail the connection of network monitoring processors 106 and network monitoring transport cards 104. In the illustrated example, a first Ethernet switch 306A interconnects network monitoring processors 106 to each other and to network monitoring transport cards 104 via a Ethernet connections 400 and 402. Similarly, a second Ethernet switch 306B interconnects network monitoring processors 106 to each other and to network monitoring processor cards 104 via Ethernet connections 406 and 408. Redundantly connecting network monitoring processors 106 and network monitoring transport cards 104 decreases the likelihood that network monitoring messages will be lost in the event of a card or card interconnection failure.

Figure 5:
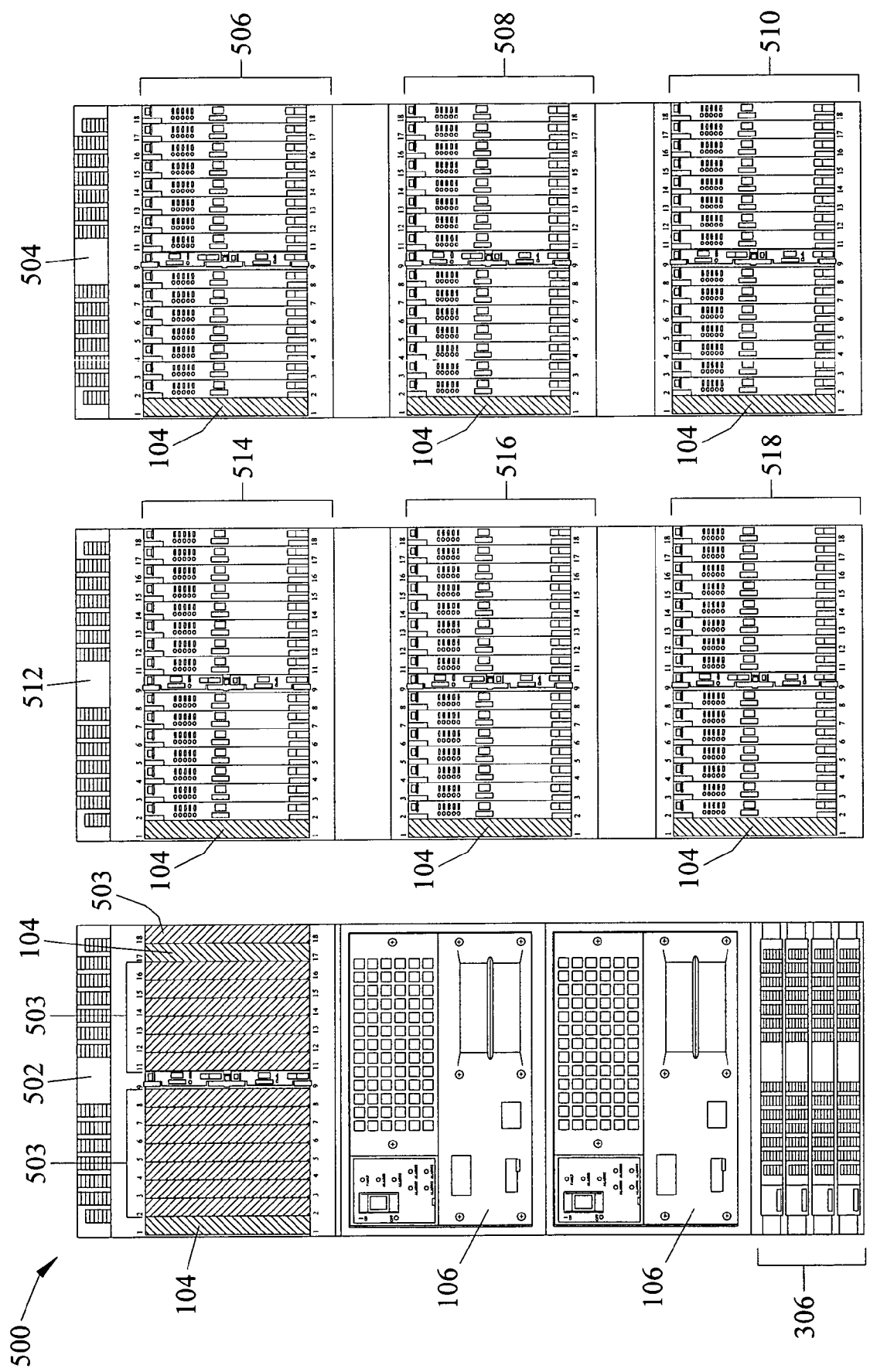
FIG. 5 is a schematic diagram of a plurality of telecommunications equipment racks holding a routing node and a plurality of network monitoring processors according to an embodiment of the present invention.

FIG. 5 illustrates and example of a multi-rack routing node including an automatically configurable network monitoring systems according to an embodiment of the present invention. In FIG. 5, routing node 500 includes a first frame 502 for holding network monitoring processors 106, network monitoring transport cards 104, and switches 306. Slots 503 in frame 502 are empty and provide the capability to add additional network monitoring transport cards 104. Frame 504 includes a control shelf 506 for carrying maintenance and administration processor cards, and extension shelves 508 and 510 for carrying link interface and database service modules. Frame 512 includes three extenion sheves 514, 516, and 518, also for carrying link interface and database service modules. In the illustrated example, each shelf in frames 504 and 512 includes a network monitoring transport card 104.

Distributing network monitoring transport cards 104 in this manner is preferred for reliability reasons because this distribution prevents a total network monitoring failure in the event that an entire shelf or frame loses power. However, the present invention is not limited to distributing network monitoring transport cards 104 across multiple shelves in multiple frames. In an alternate (but less preferred) embodiment, network monitoring transport cards 104 may be located in the same rack in the same frame.

The number of network monitoring transport cards included in a routing node depends on the number of links serviced by the routing node. In one example, there may be one network monitoring transport card per 64 signaling links plus additional network monitoring transport cards in an n+m redundancy scheme. For instance, if there are 128 links in a routing node, n=2 network monitoring processor cards may service these links. In addition, there may be m=1 redundant network monitoring transport cards in case one of the primary network monitoring transport cards fails.

System Software and Automatic Configuration Methods

Figure 6:
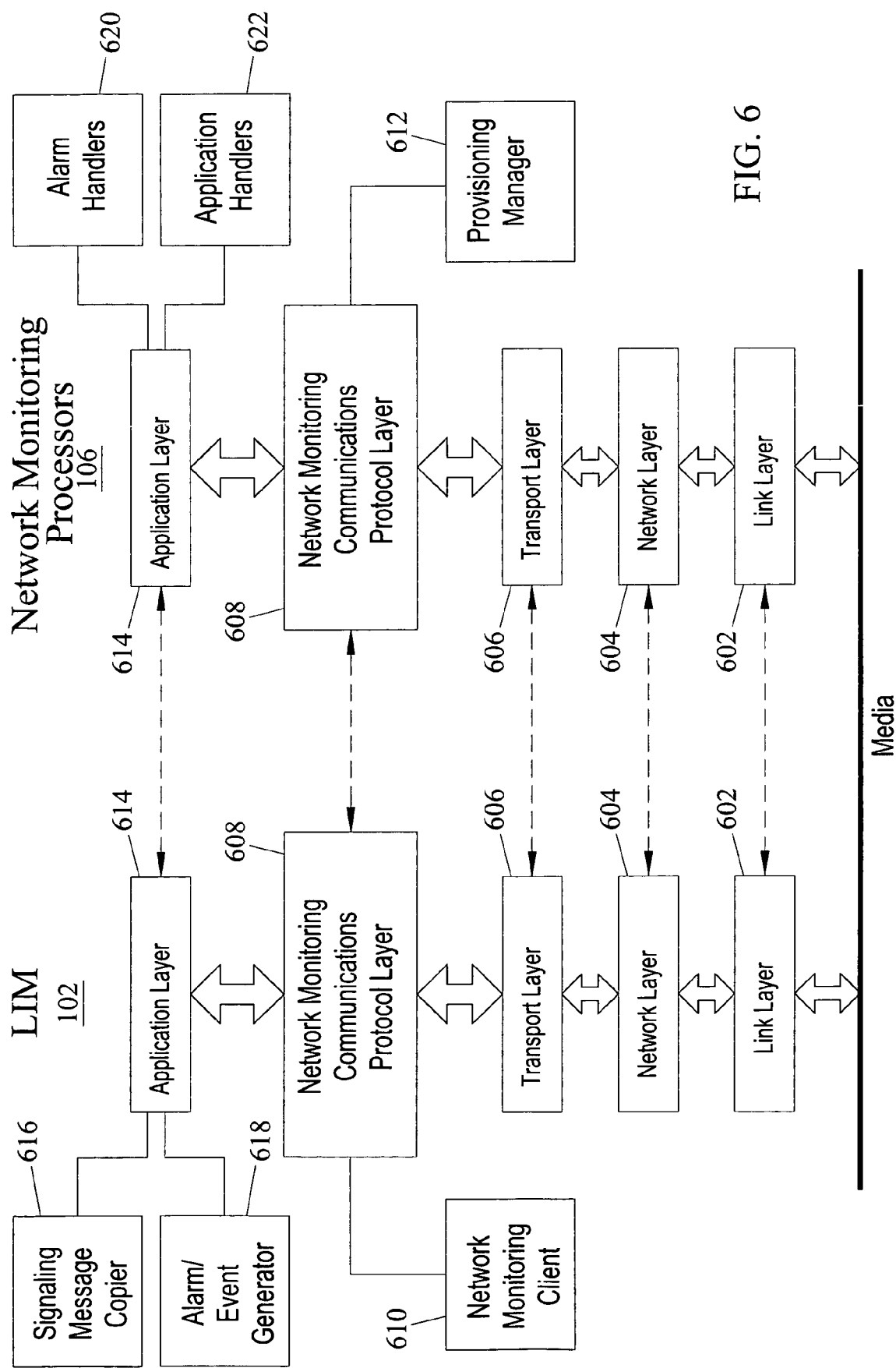
FIG. 6 is a protocol layering and software diagram illustrating exemplary protocol layers and software components of an automatically configurable network monitoring system according to an embodiment of the present invention.

As stated above, one of the primary advantages of a network monitoring system according to the present invention is the ability to automatically configure itself when the link configuration of a network routing node being monitored changes. FIG. 6 is a protocol layer and software block diagram illustrating exemplary protocol layers and software associated with an automatically configurable network monitoring system according to an embodiment of the present invention. In FIG. 6, LIM 102 and network monitoring processor 106 each include a layered communication protocol stack for communicating network monitoring messages. In the illustrated example, the communication protocol stacks each include a physical layer (represented by "Media" in FIG. 6) for sending and receiving bits over a physical medium, a link layer 602 for ensuring reliable point to point connections, a network layer 604 for datagram routing and delivery and a transport layer 606 for transporting messages over the underlying network. Layers 602, 604, and 606 may be implemented using a standard communication protocol stack, such as TCP/IP or UDP/IP over Ethernet.

According to an important aspect of the invention, each protocol stack also includes a network monitoring communications protocol layer 608 for establishing and maintaining network monitoring sessions between LIMs 102 and network monitoring processor 106. On the side of LIM 102, network monitoring communications protocol layer 608 includes a network monitoring client 610. On the side of network monitoring processor 106, network monitoring communications protocol layer 608 includes a provisioning manager 612 that functions as a network monitoring server. Network monitoring client 610 and provisioning manager 612 exchange network management protocol messages, which will be discussed in detail below, to establish and maintain network monitoring sessions and to communicate network monitoring messages over the sessions.

Application layers 614 associated with the communication protocol stacks each include one or more applications that use the services provided by network monitoring communications protocol layer 608 to perform network monitoring functions. In the illustrated example, application layer 614 of LIM 102 includes a signaling message copier 616 for copying signaling messages sent over a signaling link being monitored and an alarm/event generator 618 for generating alarms and events relating to the operation of the signaling link or routing node being monitored.

Application layer 614 of network monitoring processor 106 includes alarm handlers 620 for receiving alarms generated by alarm/event generator 618 and application handlers 622 for receiving signaling message copies copied by signaling message copier 616. Provisioning manager 612 may select an application handler 622 or an alarm handler 620 in response to a received service request based on signaling links that are pre-assigned to a particular application handler or alarm handler, in the manner discussed above.

Figure 7:
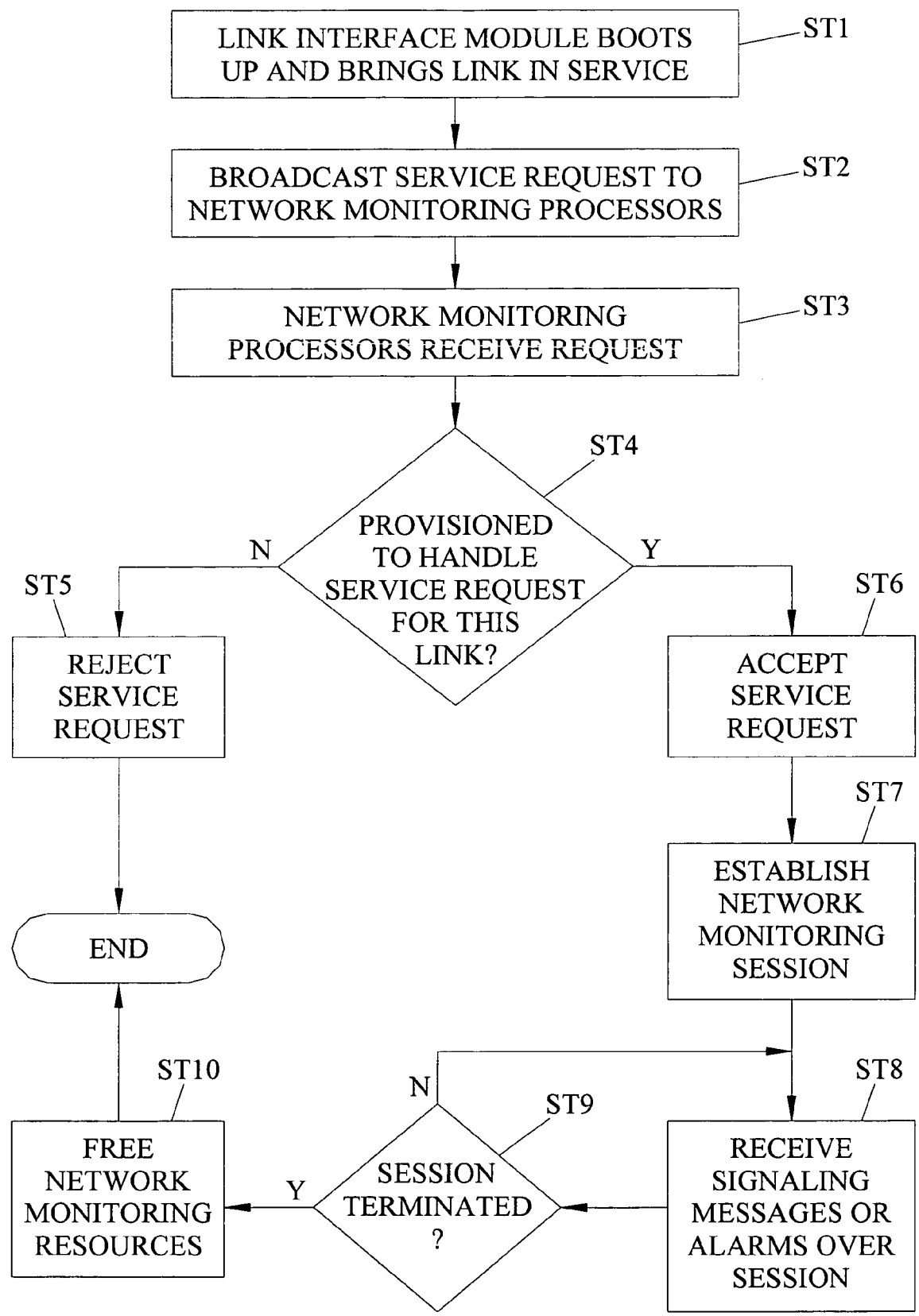
FIG. 7 is a flow chart illustrating exemplary overall steps of a method for automatically configuring a network monitoring system according to an embodiment of the present invention.

FIG. 7 is a flow chart illustrating exemplary overall steps for automatically configuring a network monitoring system according to an embodiment of the present invention. Referring to FIG. 7, in step ST1, a link interface module boots up and brings a signaling link into service. In step ST2, the network monitoring client associated with the link interface module broadcasts a service request message to a well known UDP port on which the network monitoring processor software is listening. In step ST3, the network monitoring processors receive the service request. In step ST4, software on each network monitoring processor determines if it is provisioned to handle the signaling link identified in the service request. If the network monitoring processor software determines that it is not provisioned to handle the service request, in step ST5, the network monitoring processor software discards the service request. In step ST6, if the network monitoring processor software determines that it is provisioned to handle the service request, the network monitoring processor software accepts the request. In step ST7, the network monitoring processor software establishes a network monitoring session with the requesting client.

Once a session is established, signaling messages or alarms, depending on the session type are sent from the link interface module to the network monitoring processor software via for example a TCP/IP connection (step ST8). The network monitoring transport cards forward messages received from the link interface modules to the network monitoring processors. The TCP/IP messages used to carry the network monitoring messages are addressed to the network monitoring processor software associated with the link being monitored.

According to another important aspect of the invention, the network monitoring processor and the link interface module being monitored preferably exchange heartbeat or keepalive messages at predetermined time intervals to maintain a network monitoring session. If the network monitoring processor determines that a heartbeat message has not been received within a predetermined time period, the network monitoring session is terminated (step ST9) and network monitoring resources on the network monitoring processor are freed (step ST10). Using this heartbeat mechanism, the present invention automatically detects when a link is taken out of service and reconfigures itself so that network monitoring resources are no longer dedicated to the out of service link.

Network Monitoring Messaging

According to yet another aspect of the invention, the network monitoring communications protocol includes a set of messages for establishing network monitoring sessions, exchanging information during the sessions, and changing one or more aspects of the sessions. Table 1 shown below illustrates exemplary network monitoring session messages that may be used for communications between a network monitoring client and a network monitoring server according to an embodiment of the present invention.

TABLE 1

Network Monitoring Messages

| Network Monitoring Message | Usage |
| --- | --- |
| Heartbeat | Periodic message transmitted bi-directionally to ensure connectivity between applications. |
| Service Request | A network monitoring client service request that includes the requestor's provisioning information. |
| Service Accept | A network monitoring server service acceptance response to the received service request that includes provisioning information from the grantor. |
| Service Reject | A network monitoring server service rejection response to the received service request, which includes the reason for rejection. |
| Provisioning Info | An informational message sent to the application connection that contains provisioning data. |
| Event | Network monitoring client transmission of events/alarms. |
| Link Data | Network monitoring client transmission of link data (MSUs). |
| Service Change | An indication that the network monitoring server wishes to change service modes (i.e., alter transmission mode of MSUs and/or events). |

In Table 1, the network monitoring messages include heartbeat, service request, service accept, service reject, provisioning information, event, link data, and service change. The heartbeat message is transmitted periodically by each side of a network monitoring session to maintain connectivity. The service request messages are used by network monitoring clients to request network monitoring service. The service accept and reject messages are used by the network monitoring servers to accept or reject service requests. The provisioning information message is sent from a network monitoring client to an application connection to deliver provisioning information to the application connection. The event message is sent from the network monitoring client to the network monitoring server to deliver event information to the network monitoring server. The link data message is used by the network monitoring client to deliver link data, such as a copied MSU, to the network monitoring server. The service change message is used by the network monitoring server to change the type of network monitoring service being provided.

Figure 8:
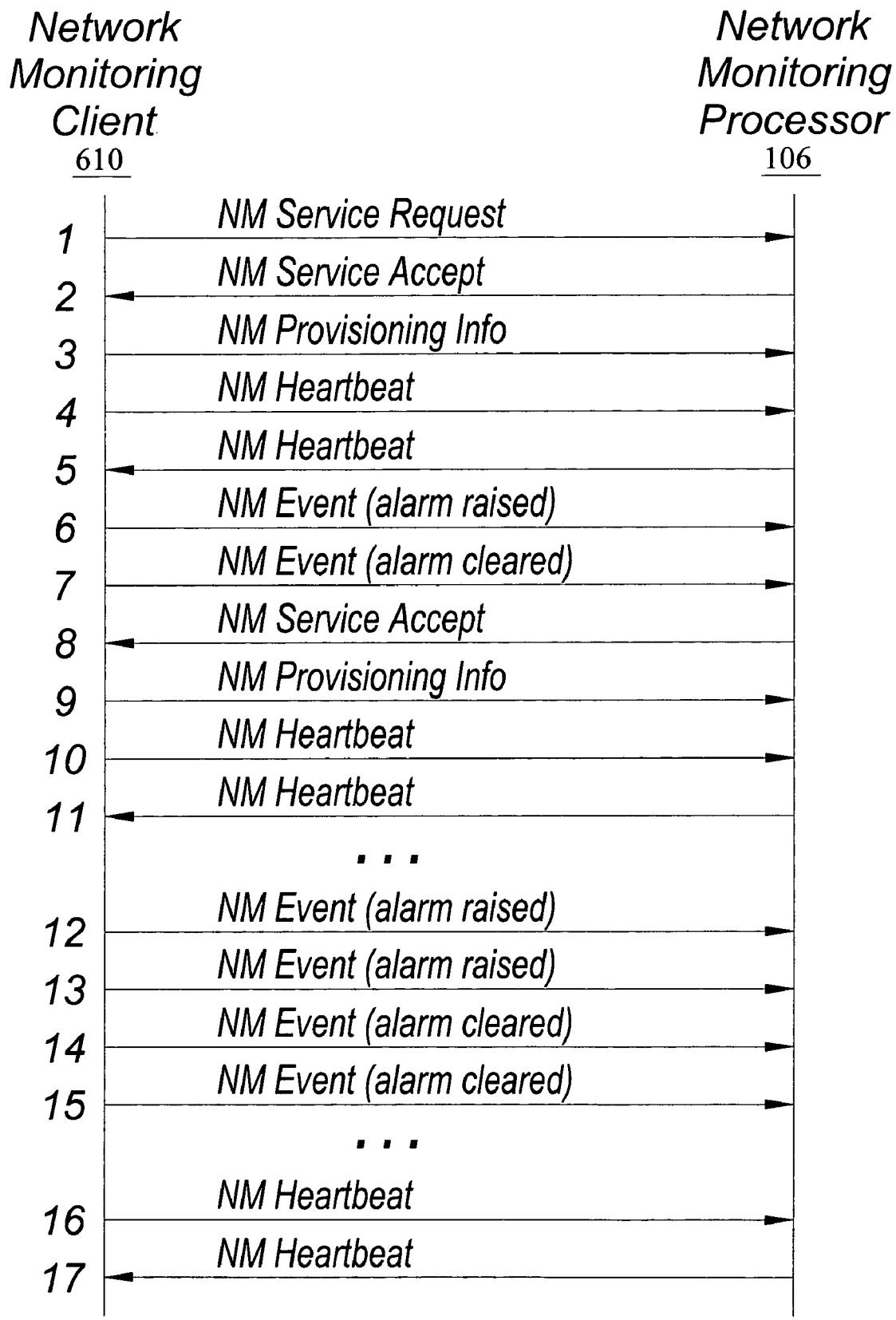
FIG. 8 is a message flow diagram illustrating exemplary messages exchanged between a network monitoring client and a network monitoring processor in establishing and maintaining an alarm session according to an embodiment of the present invention.

FIG. 8 is a message flow diagram illustrating exemplary messages that may be exchanged by network monitoring client 610 residing on a link interface module and software executing on network monitoring processor 106 in establishing and maintaining a system alarm session. Referring to FIG. 8, in line 1, network monitoring client 610 sends a network monitoring service request message to network monitoring processor 106. The network monitoring service request message includes an indicator that it requests system alarm service. The network monitoring service request message is preferably broadcast to a predetermined UDP port monitored by network monitoring processor 106.

Network monitoring processor 106 receives the network monitoring service request message. Provisioning manager 612 identifies the message as requesting alarm service and selects one or more alarm handlers 620 assigned to handle the service request. Provisioning manager 612 formulates a network monitoring accept message and, for each alarm handler assigned to process the request, sends a network monitoring service accept message. The network monitoring service request message includes for example the TCP port and IP address of the alarm handler configured to provide the requested service.

In line 3, network monitoring client 610 establishes a TCP connection with an alarm handler 620 residing at the TCP/IP address received in the service accept message and sends a provisioning information message to this address. The provisioning information message may also include provisioning information about the routing node being monitored, such as the number and type of links provided by the routing node. Once the provisioning information message is sent, an alarm session is established between alarm handler 620 and network monitoring client 610.

In lines 4 and 5, alarm handler 620 and network monitoring client 610 exchange heartbeat messages. The heartbeat messages are sent periodically to maintain the alarm session. In lines 6 and 7, network monitoring client 610 sends event messages communicating the raising and clearing of a system alarm associated with the routing node being monitored. This information may be passed to an alarm server so that the operator can take appropriate action.

In line 8, another alarm handler accepts the original service request by sending a service accept message. The network monitoring service accept message includes the new TCP port and IP address of the new alarm handler 620. In line 9, network monitoring client 610 establishes a TCP connection with the new alarm handler 620 sends a provisioning information message to the new alarm handler 620. The provisioning information message may include provisioning information about the routing node being monitored, such as the number and type of links provided by the routing node.

In lines 10 and 11, the new alarm handler 620 and network monitoring client 610 exchange heartbeat messages. In lines 12-15, network monitoring client 610 sends event messages communicating the raising and clearing of system alarms associated with the routing node being monitored. This information may be passed to an alarm server so that the operator can take appropriate action.

In lines 16 and 17, provisioning manager 612 and network monitoring client 610 exchange heartbeat messages to ensure that both ends of the connection are still alive. If network monitoring client 610 fails to send a heartbeat message within a predetermined time period, network monitoring processor 106 assumes that the link is down or removed and frees link monitoring resources associated with the downed link.

Figure 9:
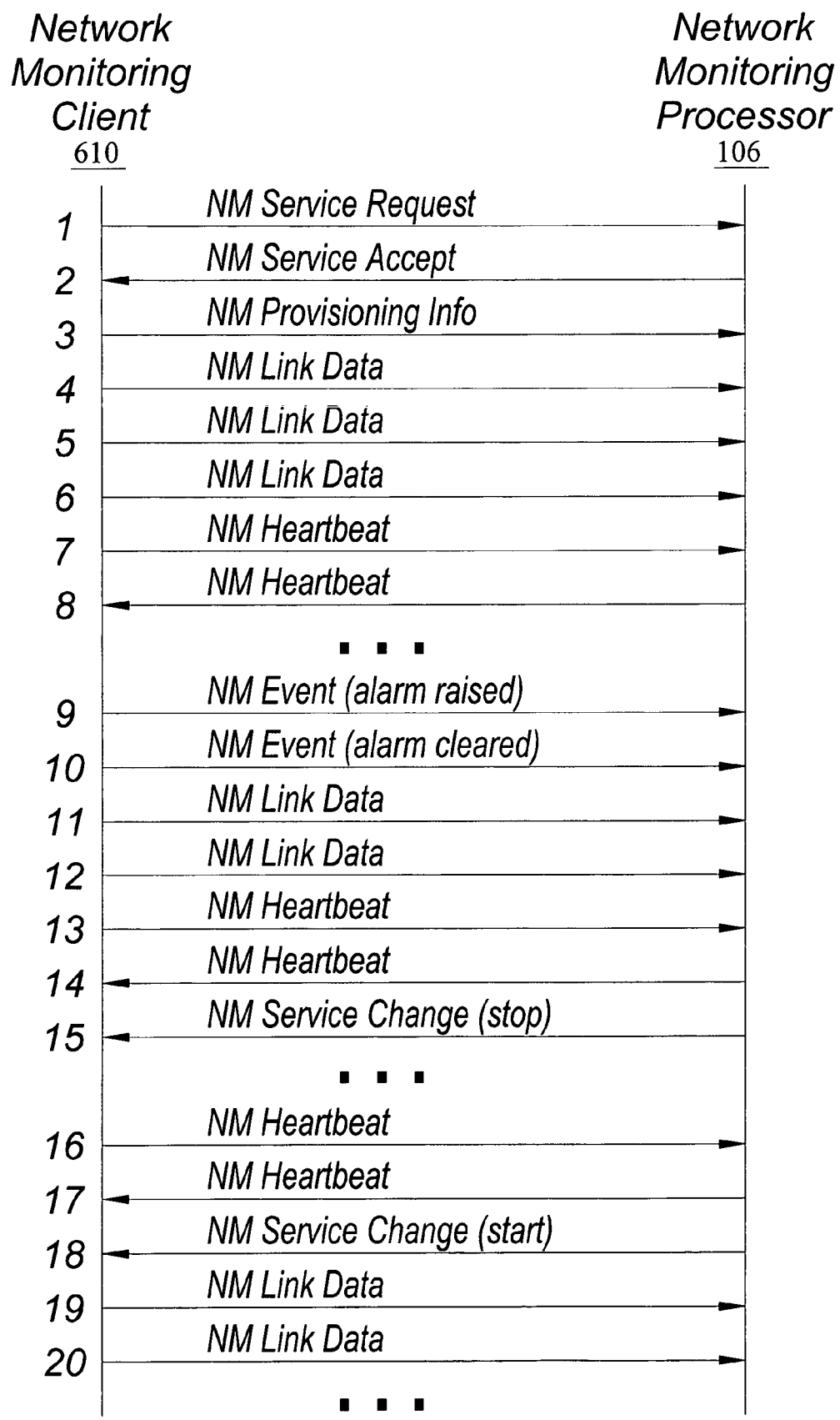
FIG. 9 is a message flow diagram illustrating exemplary messages exchanged between a network monitoring client and a network monitoring processor in establishing and maintaining a link data session according to an embodiment of the present invention.

FIG. 9 illustrates exemplary messages that may be exchanged between network monitoring client 610 and network monitoring processor 106 in establishing a link data session and communicating over the link data session. In line 1, network monitoring client 610 broadcasts a network monitoring service request to the well known UDP port on which provisioning manager 612 of network monitoring processor 106 is listening. In line 2, the provisioning manager returns the TCP address and port number of the application handler 620 assigned to provide network monitoring service for the particular link identified in the service request. Application handlers 620 are preferably preconfigured to provide network monitoring service to a predetermined set of wired and equipped signaling links in a network routing node. If a new link comes in service and request network monitoring service, an application handler 620 will be able to automatically start serving the new signaling link.

In line 3, network monitoring client 610 obtains the address of application handler 620 from the service accept message, establishes a TCP/IP connection with application handler 620 at that address, and formulates and sends a provisioning information message to application handler 620. The provisioning information message includes provisioning information regarding the routing node being monitored. After sending the provisioning information message, in lines 4-6, network monitoring client 610 sends link data messages, including copied MSUs or other types of signaling messages, to application handler 620. Application handler 620 receives and buffers the MSUs. In lines 7 and 8 network monitoring client 610 and network monitoring processor 106 exchange heartbeat messages to maintain the link data session.

In lines 9 and 10, network monitoring client 610 communicates link alarm data to application handler 620. In lines 11 and 12, network monitoring client 610 communicates additional link data to application handler 620. In lines 13 and 14, provisioning manager 612 and network monitoring client 610 exchange heartbeat messages to maintain the session.

When a user, such as a fraud or billing application, desires to stop the flow of signaling data to network monitoring processor 106, the user informs application handler 620. In response, application handler 620 sends a service change message requesting that network monitoring client 610 cease the flow of MSUs to network monitoring processor 106 (line 15). In response, network monitoring client 610 ceases sending MSU copies over the TCP/IP connection. However, the network monitoring connection is maintained via the periodic exchange of heartbeat messages (lines 16 and 17). In line 18, when the user determines to continue the flow of MSUs, application handler 620 sends a service change message requesting the MSU flow be continued. In response, network monitoring client 610 resumes sending link data (lines 19 and 20). Thus, through the exchange of a defined sequence of messages, a user can automatically maintain and control a network monitoring connection.

Timing

Network monitoring client 610, provisioning manager 612, and handlers 620 and 622 use timers to determine the next action to take. Table 2 shown below illustrates exemplary timers that may be maintained by network monitoring client 610, provisioning manager 612, and handlers 620 and 622.

TABLE 2

Network Monitoring Communication Protocol Timers

| Timer | Usage | Duration | Start | Stop | On Expiry |
|---|---|---|---|---|---|
| T-501 | Heartbeat transmission timer. | 1 second | After transmission of a Heartbeat message | Session termination. | Transmit Heartbeat message. |
| T-503 | Lost heartbeat timer. | 2 seconds | After reception of peer Heartbeat message (reset operation). | After reception of peer Heartbeat message (reset operation). | Stop all timers. Terminate. |
| T-505 | Service Response timer. | Range: 15 seconds to 60 seconds | After transmitting Service Request message. | After receiving all due responses (Service Accept/Reject messages). | Retransmit Service Request message. |

In Table 2, timers T-501-T-505 are maintained by each side of a network monitoring connection and each controls certain actions to be performed. For example, T-501 is the heartbeat transmission timer. Its duration is one second. T-501 starts after transmission of a heartbeat message and ends if the session terminates before the timer expires. If T-501 expires, a heartbeat message is transmitted. Thus, the timer T-501 causes each side of a network monitoring connection to transmit a heartbeat message every second.

Timer T-503 is used to detect lost heartbeat messages. For example, if one side of a network monitoring session receives a heartbeat message, it should receive another heartbeat message in about one second, since each side transmits a heartbeat message every second. If there is no heartbeat message received from the other side in two seconds, it is assumed that the heartbeat message is lost or the other link is out of service. In this situation, the network monitoring session is terminated.

T-505 is a retransmission timer for network monitoring service request messages. Since service request messages are broadcast over UDP, which provides unreliable datagram services, it is possible that the service request message may not reach one or more of its intended destinations. T-505 starts when a service request message is transmitted. If all due responses to the service request messages are not received within the timeout period, the service request message is retransmitted.

Network Monitoring Communication Protocol State Machines

Figure 10A:
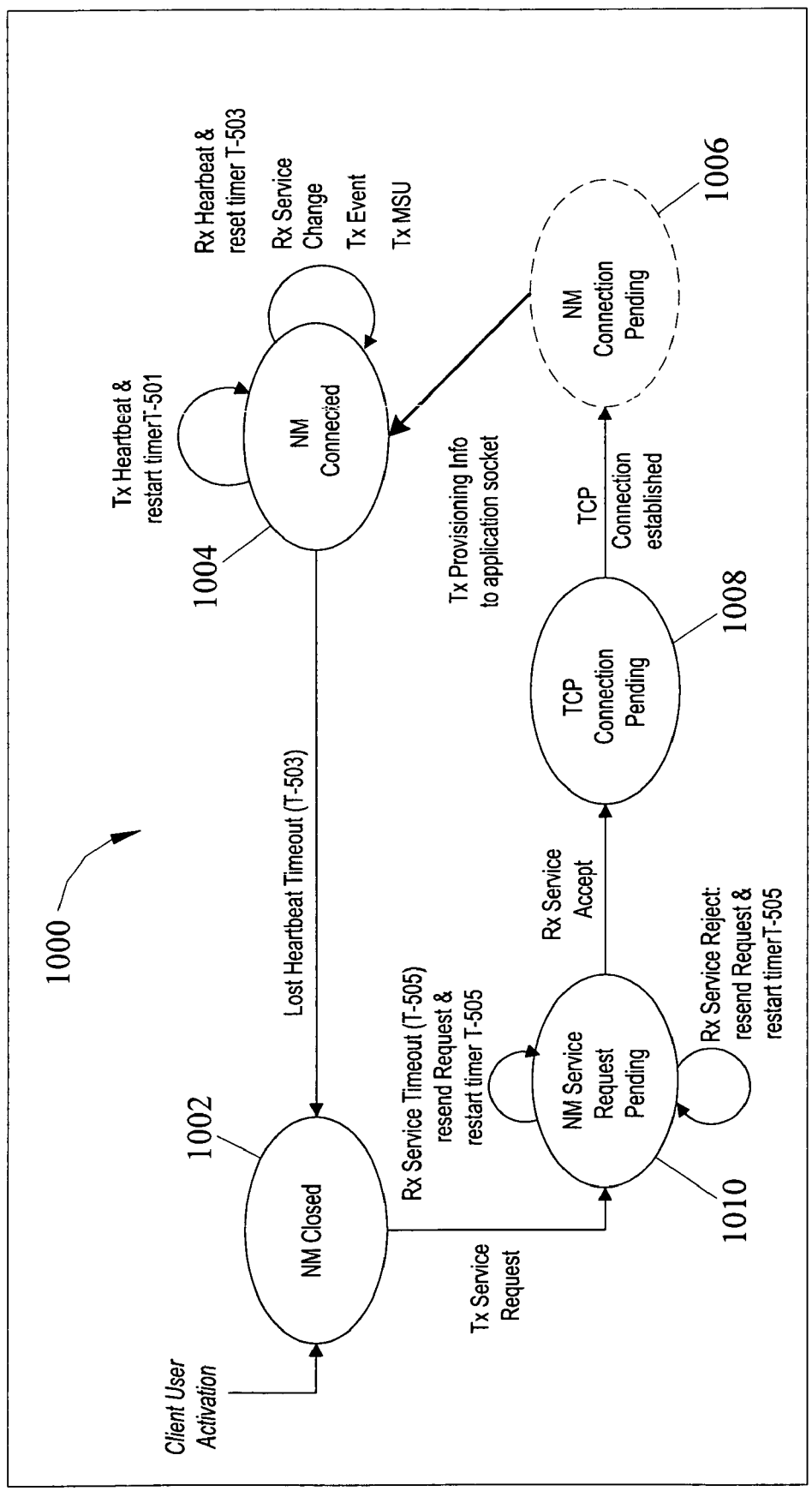
FIG. 10A is a state diagram illustrating an exemplary network monitoring client state machine according to an embodiment of the present invention.
Figure 10B:
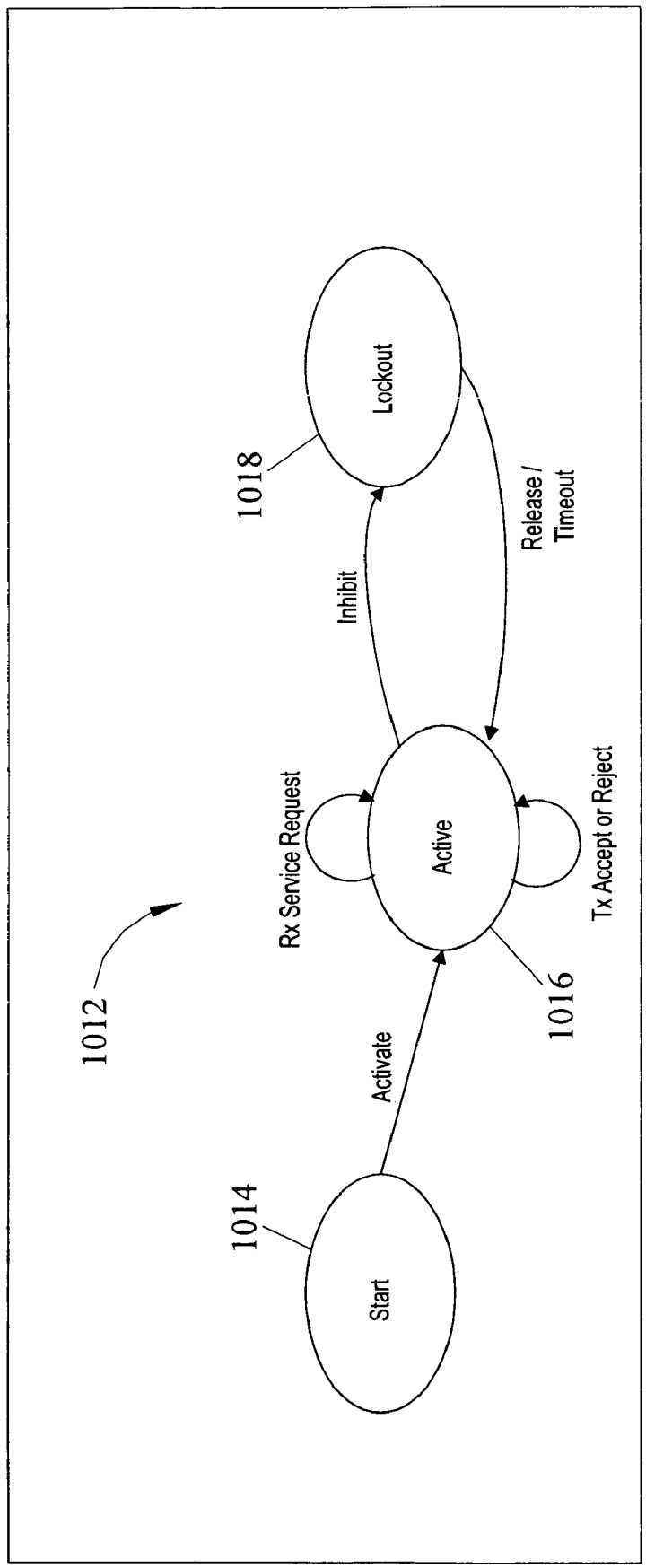
FIG. 10B is a state diagram illustrating an exemplary provisioning manager state machine according to an embodiment of the present invention.
Figure 10C:
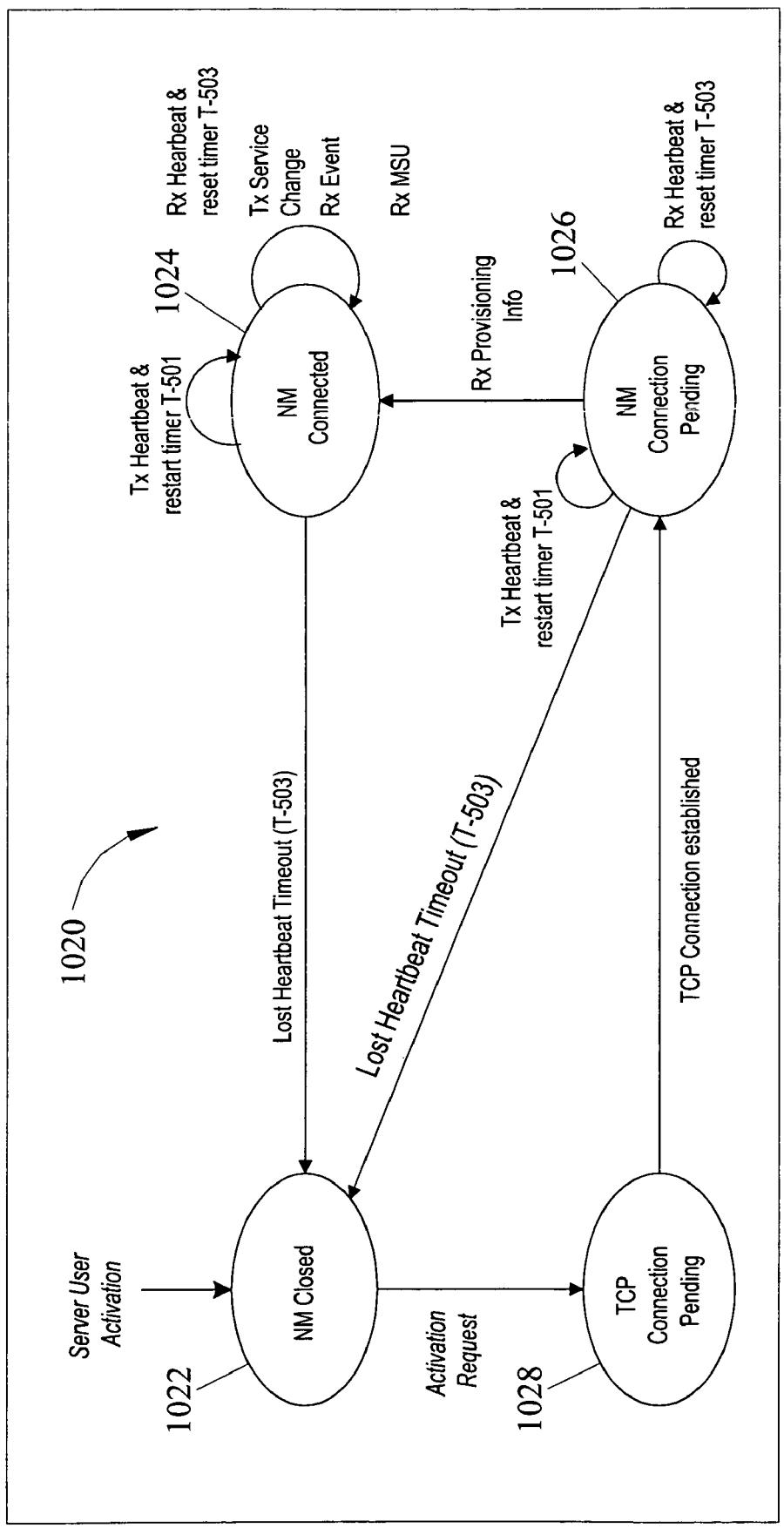
FIG. 10C is a state diagram illustrating an exemplary application handler state machine according to an embodiment of the present invention.

Network monitoring client 610, provisioning manager 612, and application handler 622 may each implement a state machine that defines the overall operation of these entities. FIGS. 10A, 10B, and 10C illustrate exemplary state machines that may be associated with network monitoring client 610, provisioning manager 612, and application handler 622, respectively. Referring to FIG. 10A, network monitoring client state machine 1000 includes a network monitoring closed state 1002, a network monitoring connected stated 1004, a network monitoring connection pending state 1006, a TCP connection pending state 1008, and a network management service request pending state 1010. The lines interconnecting the states represent state transitions. The text written on the lines indicates the actions that cause the state transitions.

Network monitoring client 610 begins in network monitoring session closed state 1002. Network monitoring client then issues a network monitoring service request, which results in a transition to network monitoring service request pending state 1010. In this state, if the service request retransmission timer times out, the service request is retransmitted, and network monitoring client 610 remains in this state. Similarly, if network monitoring client 610 receives a service reject message, network monitoring client 610 retransmits the service request and remains in state 1010. Receipt of a network monitoring service accept message causes network monitoring client 610 to transition to TCP connection pending state 1008.

In TCP connection pending state 1008, network monitoring client 610 sends a TCP connection request to the address received in the network monitoring service accept message. When the TCP connection is established, network monitoring client 610 transitions to the network monitoring connection pending state 1006. This state is a transitory state. Network monitoring client 610 remains in network monitoring connection pending state only until network monitoring client 610 transmits a provisioning information message to network monitoring application handler 622. Once this message is sent, network monitoring client 610 transitions to network monitoring connected state 1004. In state 1004, network monitoring client may send events and MSUs to network monitoring application handler 622. Network monitoring client 610 also transmits heartbeat messages to network monitoring application handler 622. If a lost heartbeat timeout occurs, network monitoring client 610 returns to network monitoring session closed state 1002.

Referring to FIG. 10B, provisioning manager state machine 1012 includes a start state 1014, an active state 1016, and a lockout state 1018. Provisioning manager 612 begins its operation in start state 1014. In this state, provisioning manager 612 activates itself and transitions to active state 1016. In active state 1016, provisioning manager 612 receives network management service request messages and either accepts or rejects the requests. If provisioning manager 612 receives an inhibit command from a user, provisioning manager 612 transitions to lockout state 612 where provisioning manager 612 remains until a release or timeout occurs.

Referring to FIG. 10C, application handler state machine 1020 includes a network monitoring session closed state 1022, a network monitoring connected state 1024, a network monitoring connection pending state 1026, and a TCP connection pending state 1028. Application handler 622 begins its operation in network monitoring session closed state 1022 and remains in this state until it receives an application request from provisioning manager 612. In response to receipt of the activation request, application handler 622 transitions to TCP connection pending state 1028. In TCP connection pending state 1028, application handler 622 waits for a TCP connection request from network monitoring client 610 and establishes a TCP connection in response to the request.

Once a TCP connection is established, application handler 622 transitions to network monitoring connection pending state 1026. In network monitoring connection pending state 1026, application handler 622 transmits heartbeat messages to network monitoring client 610 and receives heartbeat messages from network monitoring client 610. If a heartbeat is lost, application handler 622 returns to network monitoring connection closed state 1022. If application handler 622 receives provisioning information, application handler 622 transitions to network monitoring connected state 1024. In state 1024, application handler 622 receives MSUs, events, and heartbeats from network monitoring client 610. Application handler 622 also transmits heartbeats and service change requests to network monitoring client 610 in state 1024. Application handler 622 remains in state 1024 until the heartbeat from network monitoring client 610 is lost. In this case, network monitoring client 610 returns to network monitoring connection closed state 1022. Thus, as illustrated in FIGS. 10A-10C, the present invention implements state machines for automatically establishing, maintaining, and reconfiguring network monitoring connections.

Network Monitoring Message Formats

Figure 11:
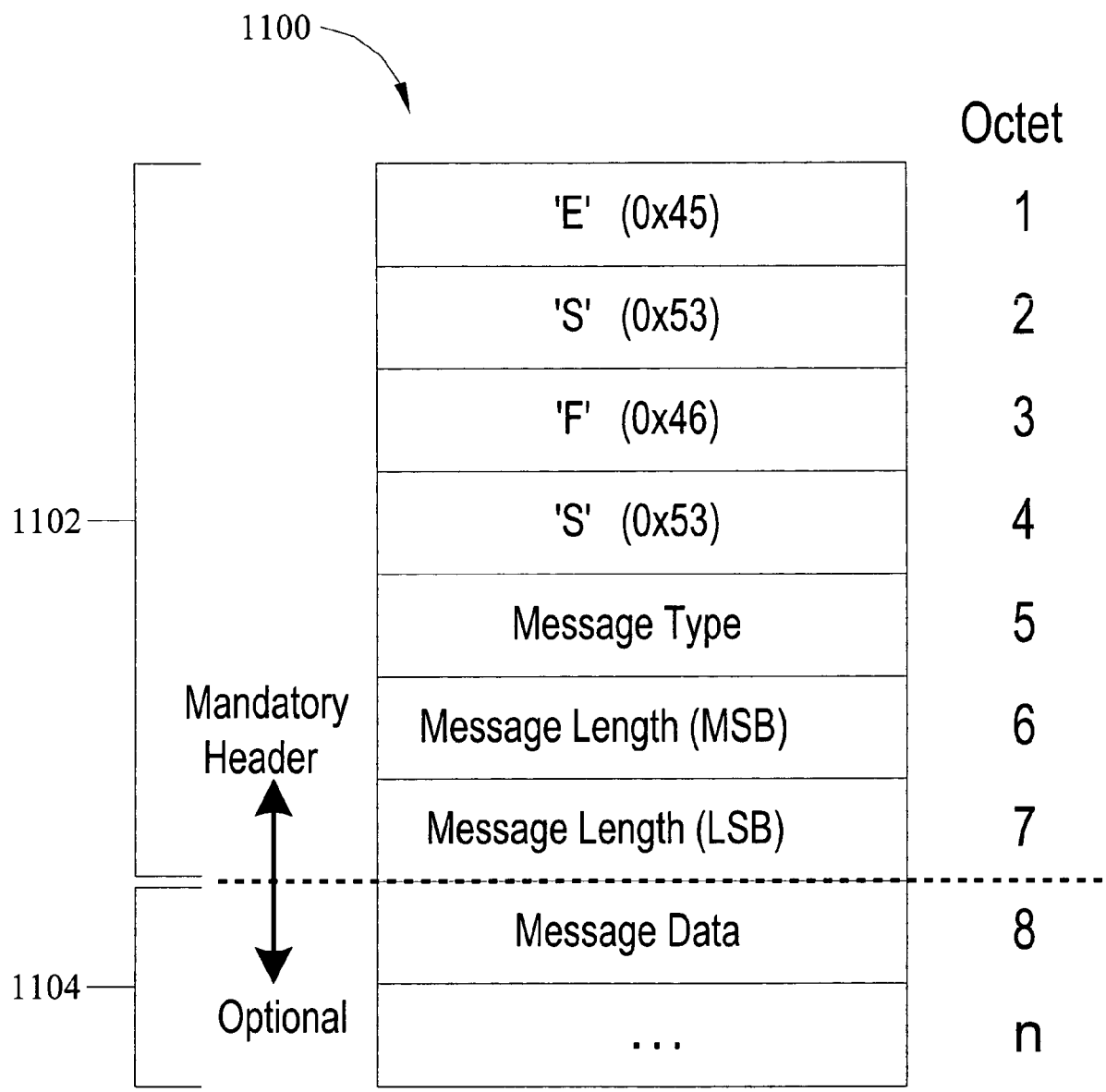
FIG. 11 is a message format diagram illustrating a generic format for a network monitoring communications protocol message suitable for use by embodiments of the present invention.

According to yet another aspect, the present invention includes message formats recognizable by network monitoring client 610, provisioning manager 612, alarm handlers 620, and application handlers 622 for performing network monitoring functions. FIG. 11 illustrates an exemplary network monitoring message format suitable for use by embodiments of the present invention. In FIG. 11, a network monitoring message 1100 includes a header portion 1102 and a data portion 1104. Header portion 1102 includes a mandatory preamble that identifies the message as a network monitoring message. In the illustrated example, the preamble includes the characters "ESFS". The header also includes a message type field for storing the message type and a message length field for storing the length of the message. Table 3 set forth below illustrates exemplary values that may be used to identify the various network monitoring message types:

TABLE 3

Network Monitoring Message Type Codes

| Message | Coding | Indication |
|---|---|---|
| Heartbeat | 0x01 | Periodic message transmitted to ensure connectivity. |
| Service Request | 0x02 | Service request from the routing node being monitored. |
| Service Accept | 0x82 | Service response from the network monitoring processor indicating acceptance of service request. |
| Service Reject | 0xC2 | Service response from the network monitoring processor indicating rejection of service request. |
| Provisioning Info | 0x04 | Connectivity message to application handler connection, which includes provisioning information, from the routing node being monitored. |
| Event | 0x05 | Event/Alarm indication from the routing node being monitored. |
| Link Data | 0x06 | Link data (MSUs) indication from the routing node being monitored. |
| Service Change | 0x07 | Network monitoring processor request to change service mode (i.e., alter transmission mode of MSUs and/or events). |

In Table 3, the leftmost column contains the names of the network monitoring messages used to implement the present invention. The next column stores 10 the hexadecimal code stored in the message type field of the network management message header illustrated in FIG. 11. The final column in Table 3 includes a short description of the function of each message type.

Figure 12:
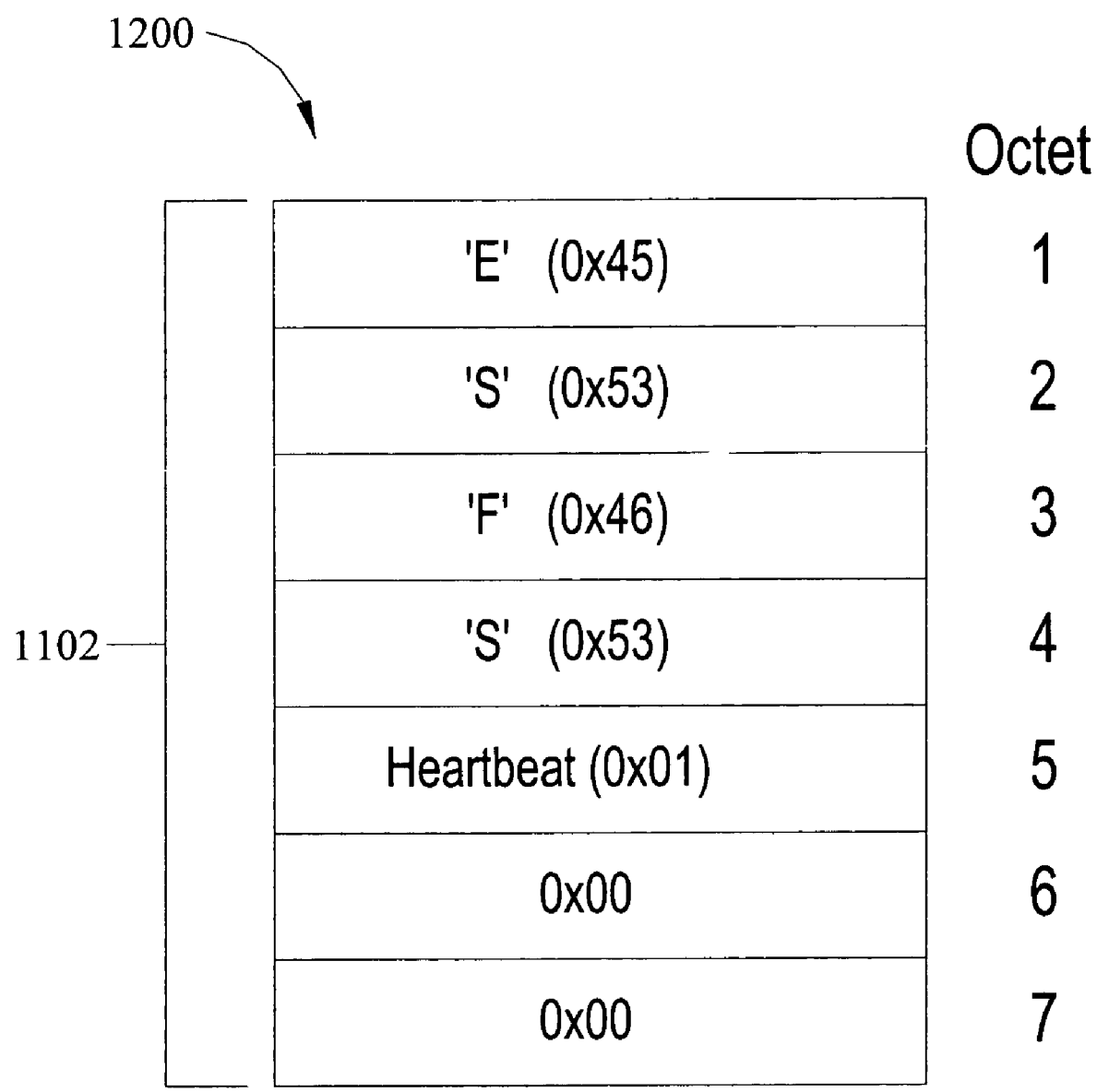
FIG. 12 is a message format diagram illustrating an exemplary format for a heartbeat message suitable for use by embodiments of the present invention.

FIG. 12 illustrates an exemplary heartbeat message format suitable for use by embodiments of the present invention. In FIG. 12, heartbeat message 1200 includes a header 1102 and a data portion 1104. The header portion of heartbeat message 1200 includes the heartbeat message type code (0x01). The data portion of heartbeat message 1200 contains all zeros. The heartbeat message is not required to carry any data because its use is simply to verify that the remote end of a connection is still functioning.

Figure 13:
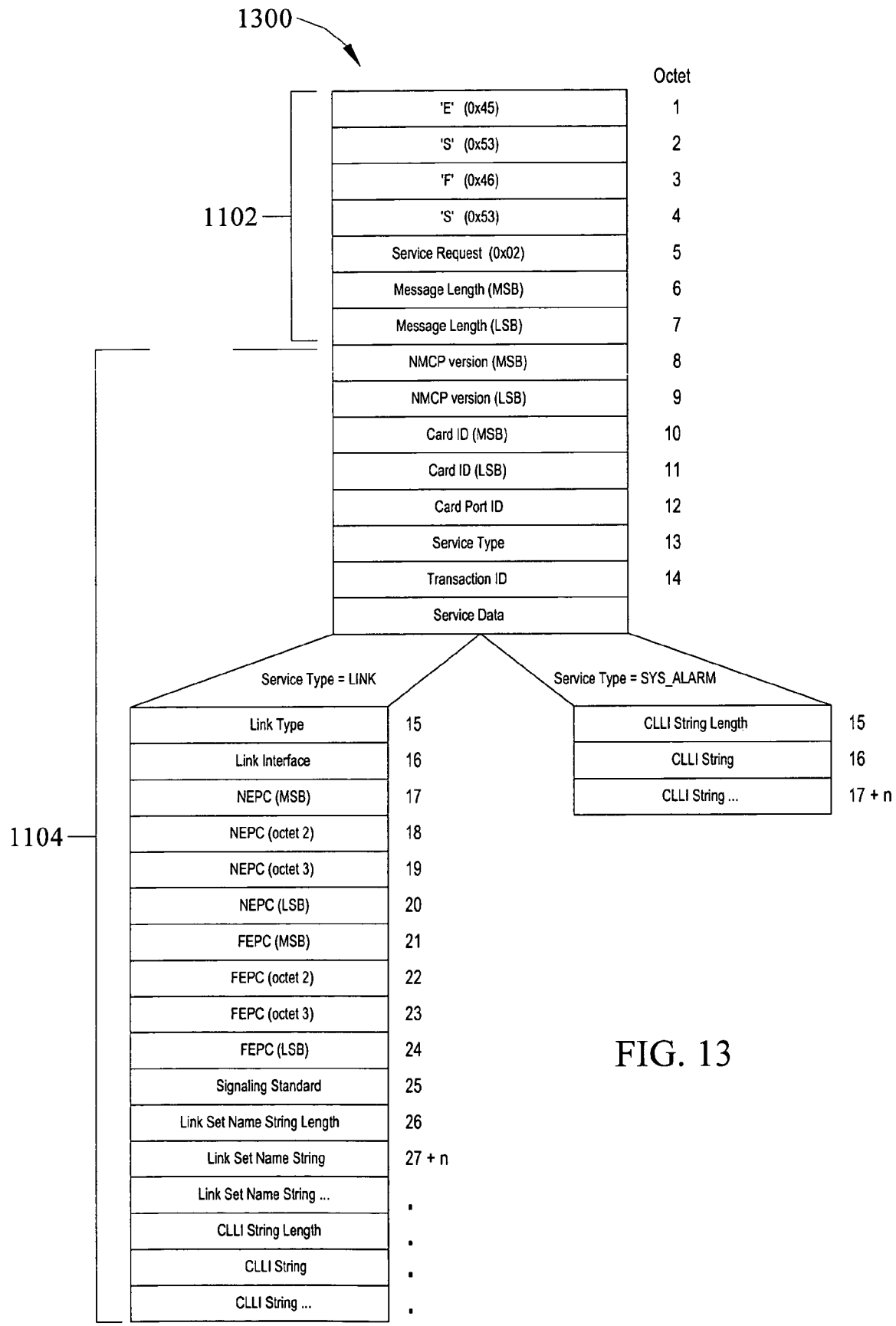
FIG. 13 is a message format diagram illustrating an exemplary format for a service request message suitable for use by embodiments of the present invention.

FIG. 13 illustrates an exemplary network monitoring service request message format suitable for use by embodiments of the present invention. In FIG. 13, network monitoring service request message 1300 includes a header portion 1102 and a data portion 1104. Header portion 1102 identifies the message as a network monitoring service request message. Data portion 1104 includes a plurality of fields associated with requesting network monitoring service. Each of these fields will now be described in detail.

The data portion of a service request message begins with the eighth octet. The eighth and ninth octets in service request message 1300 contains the network monitoring communication protocol version number, which is used to establish compatibility between network monitoring client 610 and alarm and application handlers 620 and 622 associated with network monitoring processor 106. The network monitoring communications protocol version octets field contains a value indicating the version of the network monitoring communications protocol being used by the entity that sent the network monitoring service request message.

Octets ten and eleven in service request message 1300 contain the card ID. The card ID is used to identify a particular card or printed circuit board in the routing node being monitored. In one example, the card ID field may be a two-octet field indicating the slot location (e.g., 1101, 1207, 2205, etc.) of the card.

Octet twelve in service request message 1300 contains the card port ID of the card that sent the service request message. The card port ID identifies the port requesting service on the card.

Octet thirteen in service request message 1300 contains the service type. The service type identifies the type of service being requested. Table 4 shown below illustrates exemplary service types that may be stored in the service type field.

TABLE 4

Service Types and Type Codes

| Coding | Indication |
| --- | --- |
| 0x01 | LINK DATA reporting |
| 0x02 | SYSTEM ALARM reporting |

Octet fourteen in service request message 1300 contains the transaction ID. The transaction ID identifies a particular request. As service request messages may be retransmitted, this field provides the means of identifying which request is being processed. The transaction ID field of the initial service request message may be coded to one (1). The transaction ID field may be incremented when the contents of the service request message change.

Octet fifteen in service request message 1300 contains the link type. The link type is used to indicate the type of SS7 link that is being provisioned. Table 5 shown below illustrates exemplary values that may be included in the link type field to encode various SS7 link types.

TABLE 5

Link Type Values

| Coding | Indication |
| --- | --- |
| 0x41 ('A') | A (Access) link |
| 0x42 ('B') | B (Bridge) link |
| 0x43 ('C') | C (Cross) link |
| 0x44 ('D') | D (Diagonal) link |
| 0x45 ('E') | E (Extended) link |
| 0x46 ('F') | F (Fully associated) link |

Octet sixteen in service request message 1300 contains the link interface. The link interface is used to indicate the physical interface for the SS7 link for which network monitoring service is being requested. Table 6 shown below illustrates exemplary values that may be included in the link type field to encode various physical link types.

TABLE 6

Physical Interface Type Codes

| Coding | Indication |
| --- | --- |
| 0x01 | DS0A - 56K |
| 0x02 | DS0A - 64K |
| 0x03 | V.35 - 56K |
| 0x04 | V.35 - 64K |
| 0x05 | OCU - 56K |
| 0x06 | OCU - 64K |
| 0x07 | E1/T1 - 56k |
| 0x08 | E1/T1 - 64k |

Octets seventeen through twenty in service request message 1300 contain the near end point code (NEPC) assigned for the SS7 link for which network monitoring service is being requested. Table 7 shown below illustrated exemplary point code encoding for the most significant byte of the NEPC field.

TABLE 7

Point Code Type Octet Coding

| Coding | Indication |
| --- | --- |
| 0x00 | ANSI National FULL Point Code Routing |
| 0x01 | ITU International Point Code Routing |
| 0x02 | ITU National Point Code Routing |
| 0x03 | ANSI Network Point Code Routing |
| 0x04 | ANSI Simple Network Cluster Addresses |
| 0x05 | ANSI All Network Cluster Addresses |
| 0x06 | ANSI All Full Point Code and Network Cluster Address |
| 0x07 | ANSI All Addresses of a Network Cluster |
| 0x08 | ANSI All Addresses of a Network Cluster and Network Cluster Addresses |

Octets twenty-one through twenty-four in service request message 1300 contain the far end point code (FEPC). The FEPC is used to indicate the far end point code assigned for the SS7 link for which SS7 network monitoring service is being requested. The MSB octet contains an indication of the point code standard, as defined in Table 7.

Octet twenty-five in service request message 1300 contains the signaling standard. This field is used to indicate the signaling standard assigned to the SS7 link for which network service is being requested. The signaling standard contains a value as defined in Table 8 shown below.

TABLE 8

Signaling Standard Codes

| Coding | Indication |
| --- | --- |
| 0x01 | ANSI |
| 0x02 | ITU International |
| 0x03 | ITU National |

Octet twenty-six in a service request 1300 message contains the linkset name string length. The octets following the linkset name string length field in service request message 1300 contain the linkset name string. The linkset name string octets contain a string representing the link's assigned name (e.g., "Boston187").

The octet following the linkset name string in service request message 1300 contains the CLLI string length. The octets following the CLLI string length in the Service Request message contains the CLLI string. The CLLI string octets contain a string representing the assigned CLLI (e.g., "RLGHNCXA03W").

FIG. 14 illustrates an exemplary service accept message format suitable for use by embodiments of the present invention. In FIG. 14, service accept message 1400 includes a header portion 1102 and a data portion 1104. Header portion 1102 includes a message type code (0x82) for identifying the message as a service accept message. Data portion 1104 includes various fields relating to service acceptance, which will now be described in detail.

The first octet after header portion 1102 in the service accept message is octet eight. The eighth and ninth octets in service accept message 1400 contain a network monitoring communication protocol version number. The version number is used to establish compatibility between network monitoring client 610 and network monitoring communication protocol software executing on network monitoring processor 610.

Octet ten in service accept message 1400 contains the service mode. The service mode is used to indicate the type of service granted by network monitoring processor 106. The service mode octet contains one of the values defined in Table 9 shown below to indicate the service mode.

TABLE 9

| Service Mode | |
|---|---|
| Coding | Indication |
| 0x01 | Copy Rx MSUs Only |
| 0x02 | Copy Tx MSUs Only |
| 0x03 | Copy All MSUs |
| 0x04 | Alarm Service Only |
| 0x05 | Alarm Service and Copy Rx MSUs |
| 0x06 | Alarm Service and Copy Tx MSUs |
| 0x07 | Alarm Service and Copy All MSUs |

The codes in Table 9 indicate the type of service that network monitoring processor 106 accepts. For example, if network monitoring processor 106 returns a service mode of 0x06 to network monitoring client 610 in the service accept message, this indicates to network monitoring client 610 that network monitoring processor 106 has accepted service for copies of received message signal units only. In response to such a service acceptance, network monitoring client 610 can begin send copies of received MSUs to the network monitoring processor 106 that accepted the service request.

Octet eleven in service accept message 1400 contains the transaction ID. The Transaction ID is used to correlate service request messages service responses. For example, in order to accept a particular service request, network monitoring processor 106 copies the transaction ID value from the corresponding field in the service request message. When network monitoring client 610 receives the service accept message, network monitoring client 610 uses the transaction ID field to match the service acceptance message with a pending service request.

Octet twelve in service accept message 1400 contains a value indicating the number of responses. The number of responses value inform the network monitoring client 610 of the number of service responses that will be transmitted in response to a particular service request. For instance, in the case of alarm service request, there may be multiple entities responding to the service request.

Octets thirteen through sixteen in service accept message 1400 contain the IP Address of the entity accepting the service request. The entity may be an application handler 622 or an alarm handler 620. Network monitoring client 610 uses this IP address to establish a network monitoring connection with the grantor. As described above, the service request message is broadcast to all application processors 106. However, only the application processor(s) provisioned to provide service for a particular link agree to provide service for that link. The IP address is used by network monitoring client 610 to receive service from the granting entity.

Octets seventeen and eighteen in the service accept message 1400 contain the TCP port number of the entity on application processors 610 that accepts a particular service request. For example, service may be accepted by a particular application handler 622 or a particular alarm handler 620. Each of these entities comprises software listening on a predetermined TCP port. This TCP port number is returned in the service accept message so that network monitoring client 610 can initiate a network monitoring connection with the service providing entity at the specified TCP port.

Figure 15:
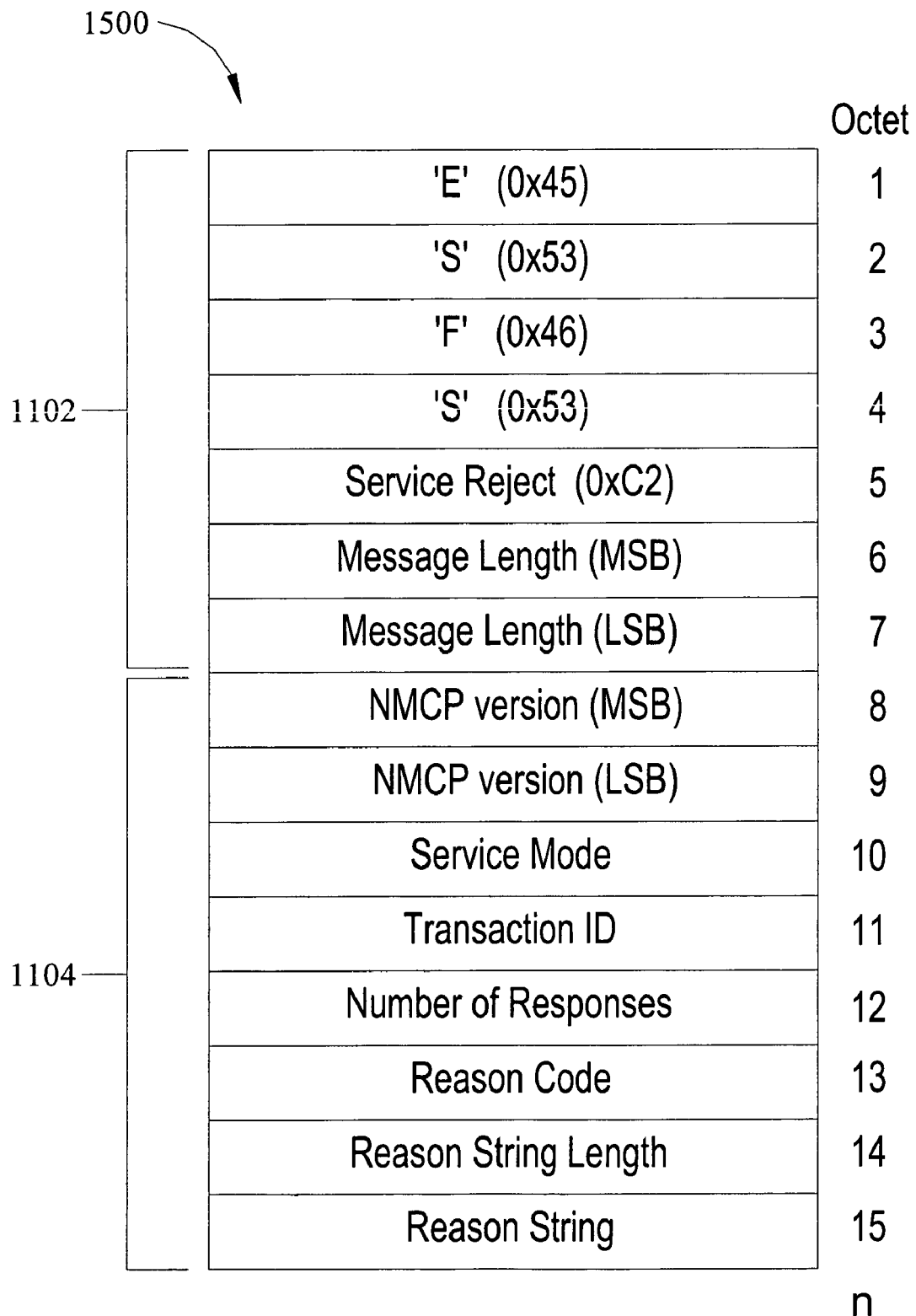
FIG. 15 is a message format diagram illustrating an exemplary format for a service reject message suitable for use by embodiments of the present invention.

FIG. 15 illustrates an exemplary service reject message format suitable for use by embodiments of the present invention. In FIG. 15, service reject message includes a header portion 1102 and a data portion 1104. Header portion 1102 includes a value (0xC2) used to identify the message as a service reject message. Data portion 1104 of service reject message 1500 includes various fields associated with service rejection, which will now be explained in detail.

Octet 8 is the first octet in data portion 1104 of service reject message 1500. The eighth and ninth octets in service reject message 1500 contain the network monitoring protocol version number. As stated above, the version number is used by software executing on the routing node being monitored and software on network monitoring processor 106 to identify the network monitoring communications protocol version being used.

Octet ten in service reject message 1500 contains a service mode value (0x00) indicating that no service is being granted. Thus, unlike the service accept message, which contains a value indicating a type of service being granted, service reject message 1500 includes a service type value indicating that no service is being granted.

Octet eleven in service reject message 1500 contains a transaction identifier. As stated above, the transaction identifier is used by network monitoring client 610 and network monitoring communication protocol software executing on processor 106 to match messages belonging to the same transaction. For example, to reject a particular service request, provisioning manager 612 executing on network monitoring processor 106 preferably copies the transaction ID from a received service request message into the corresponding field of a service reject message to be sent to the requesting entity.

Octet twelve in service reject message 1500 contains the number of responses that will be sent in response to a particular service request. Network monitoring client 610 uses this value to determine whether all responses have been received in response to a service request. If all responses have not been received within a predetermined timeout period as described above, network monitoring client 610 may re-issue the service request.

Octets thirteen in service reject message 1500 contains a value indicating the reason that network monitoring processor 106 rejected the particular service request. Table 10 shown below indicates various reasons and corresponding codes that may be used in a service reject message.

TABLE 10

| Service Rejection Reason Codes | |
|---|---|
| Coding | Indication |
| 0x01 | Bad NMCP Version |
| 0x02 | No Resources Available |
| 0x03 | Administratively Disabled |
| 0x04 | Invalid Message Coding |

From Table 10, one reason for rejecting a service request is when the service request message contains a network monitoring communication protocol version that is either invalid or incompatible with the version being run on the network monitoring processor answering the service request. Another reason for rejecting the service request is when network monitoring processor 106 lacks resources to provide the requested network monitoring service. Additional reasons for rejecting a service request that may be included in service reject message 1500 are invalid coding of the service request message and administrative disablement of the service providing functions.

Octet fourteen in service reject message 1500 contains the reason string length. The reason string length octet contains a value indicating the length of a variable length reason text string providing further information as to why service is rejected. The octets following the reason string length in service reject message 1500 contain a text string representing the reason that the service request has been rejected (e.g., "Invalid coding of service mode field").

Figure 16:
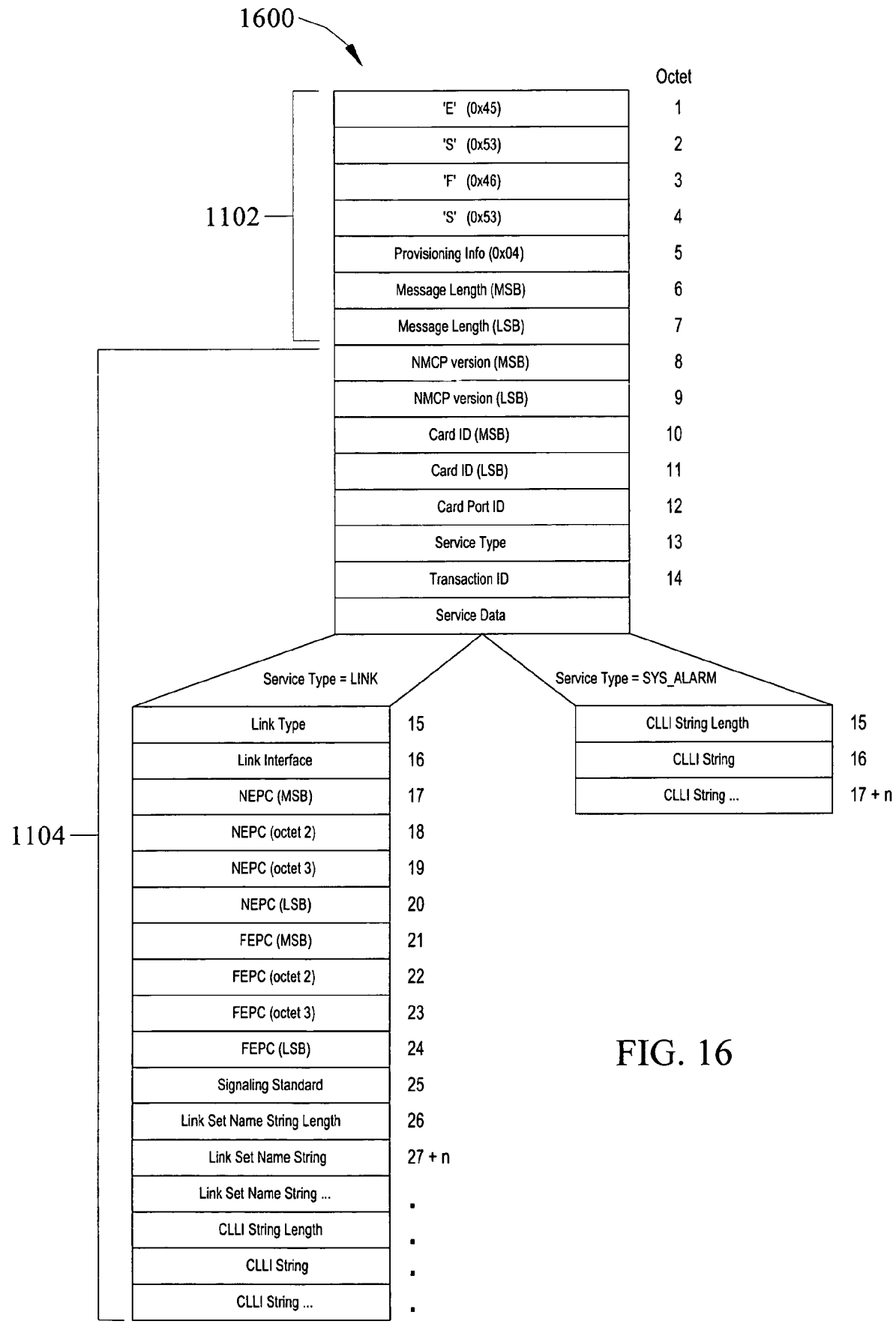
FIG. 16 is a message format diagram illustrating an exemplary format for a provisioning information message suitable for use by embodiments of the present invention.

FIG. 16 illustrates an example of a provisioning information message format suitable for use by embodiments of the present invention. As discussed above, network monitoring client 610 the provisioning info message to provide the provisioned SS7 link data to provisioning manager 612. As illustrated in FIG. 16, provisioning info message 1600 includes a header portion 1102 and a data portion 1104. Header portion 1102 includes a value (0x04) identifying the message as a provisioning information message. Data portion 1104 includes various fields carrying the link provisioning information of the node being monitored. Each of the octets in data portion 1104 of provisioning info message will now be explained in further detail.

The eighth and ninth octets in provisioning info message 1600 contain the network monitoring communication protocol version number. As discussed above, the network monitoring communication protocol version number is used to establish compatibility between network monitoring communication protocol software executing on the routing node being monitored and on network monitoring processor 106

Octets ten and eleven in provisioning info message 1600 contain an identifier for the card slot of the card in the routing node corresponding to the link being monitored. Octet twelve in provisioning info message 1600 contains a value that identifies the particular port requesting service in the routing node being monitored.

Octet thirteen in provisioning info message 1600 contains a value that indicates the type of service granted by network monitoring processor 106. Table 4 illustrated above includes exemplary service type codes that may be stored in octet 13 of provisioning info message 1600.

Octet fourteen in the provisioning info message 1600 is stores a value indicating a particular service request. Network monitoring client 610 preferably includes the same value in octet 14 of provisioning info message 1600 that was included in the corresponding field of the service accept message. Network monitoring communication protocol software executing on network monitoring processor 106 uses the transaction ID in the provisioning info message to match the provisioning info message with a particular service acceptance.

Octet fifteen in provisioning info message 1600 contains the link type. The link type is used to indicate the type of SS7 link being monitored. Exemplary encodings for the link type octet are shown above in Table 5.

Octet sixteen in provisioning info message 1600 contains the physical link interface type. Table 7 shown above illustrates exemplary encodings for the physical link interface type.

Octets seventeen through twenty in provisioning info message 1600 contain the near end point code. As discussed above with respect to the service request message, the near end point code is a value that indicates the point code terminated by the signaling link being monitored. Octets twenty-one through twenty-four in provisioning info message 1600 contain the far end point code. As discussed above with respect to the service request message, the far end point code is the point code at the far end of the signaling link being monitored.

Octet 25 in provisioning info message 1600 contains the signaling standard. Exemplary signaling standards and their corresponding codes are illustrated above in Table 8.

Octet twenty-six in provisioning info message 1600 contains the linkset name string length. The linkset name string length indicated the length in octets of the linkset name that follows. The octets following the linkset name string length field in provisioning info message 1600 contain the linkset name string. As discussed above with respect to the service request message, the linkset name string octets contain a string representing the link's assigned name (e.g., "Boston187").

The octet following the linkset name string in provisioning info message contains the CLLI string length indicating the length of the CLLI string field that follows. The octets following the CLLI string length in provisioning info message 1600 contain the CLLI string. The CLLI string octets contain a string representing the assigned CLLI (e.g., "RLGHNCXA03W").

Figure 17:
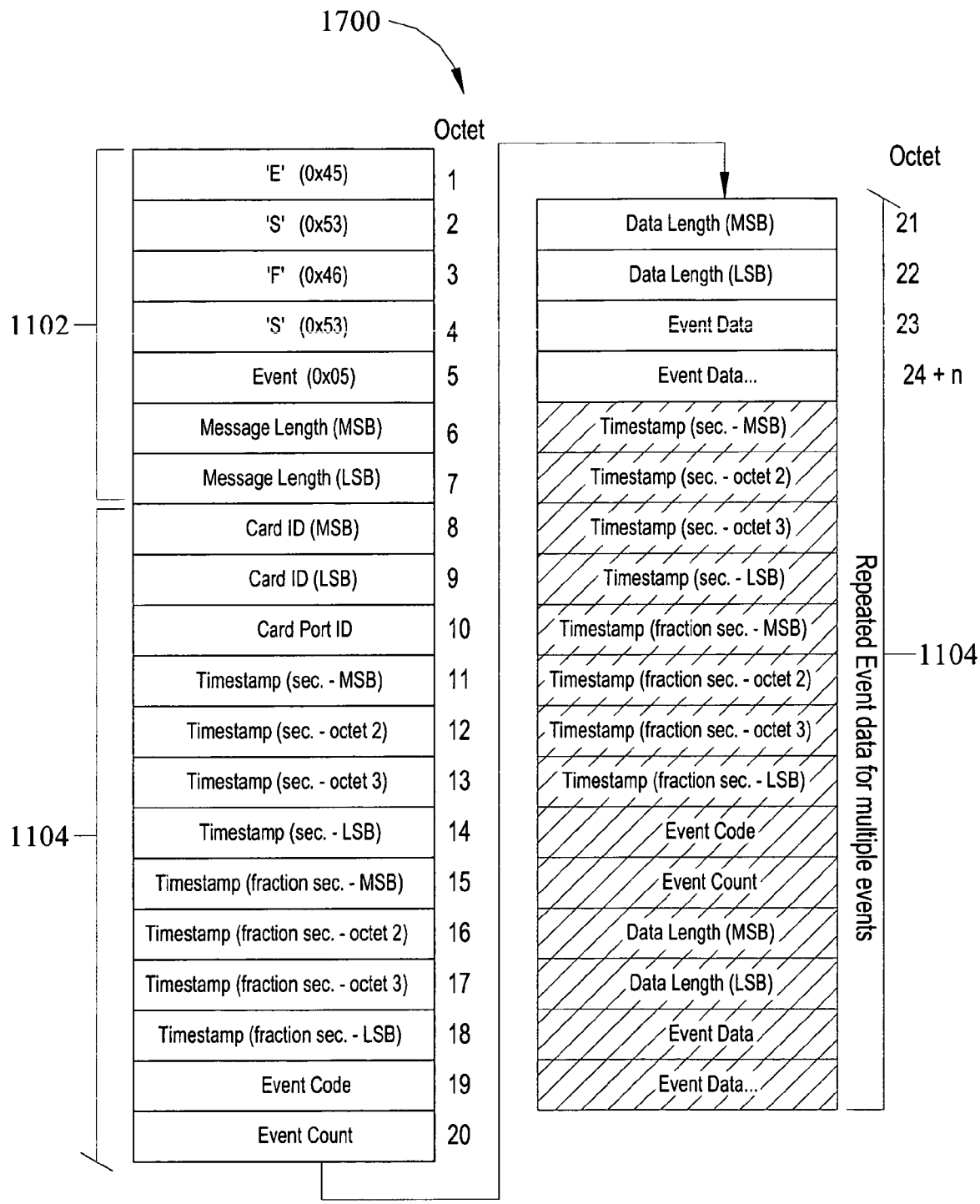
FIG. 17 is a message format diagram illustrating an exemplary format for an event message suitable for use by embodiments of the present invention.

The event message is used to carry event information from network monitoring client 610 to network monitoring processor 106. FIG. 17 illustrates an event message suitable for use by embodiments of the present invention. In FIG. 17, event message 1700 includes a header portion 1102 and a data portion 1104. Header portion 1102 preferably includes a value (0x05) for identifying the message as an event message. Data portion 1104 includes various fields for communicating event information to network monitoring processor 106. These fields will now be discussed in more detail. Octets eight and nine in event message 1700 contain the card ID. The card ID identifies a particular card in the routing node being monitored from which the event message originated. In one example, the card ID may store the slot location of the card associated with the event.

Octet ten in event message 1700 contains the card port ID. The card port ID identifies the port on the routing node being monitored that witnessed the reported event.

Octets eleven through eighteen in event message 1700 contain a timestamp. The timestamp represents the time that the event being reported occurred. The timestamp may be in any suitable format, such as the Unix timespec format of thirty-two (32) bits for seconds since Jan. 1, 1900 and thirty-two (32) bits for nanoseconds.

Octet nineteen in event message 1700 contains an event code for the event being reported. Table 11 shown below illustrated exemplary events and corresponding codes that may be included in the event code field.

TABLE 11

Events and Corresponding Event Codes

| Code | Indication | Description |
|------|------------|-------------|
| 0x10 | NMTC Card Unavailable | NMTC card is out of service |
| 0x11 | NMTC Card Available | NMTC card is in service |

TABLE 11-continued

Events and Corresponding Event Codes

| Code | Indication | Description |
|---|---|---|
| 0x12 | NMTC Network Unavailable | The Network connected to the DCM (port A/B) is inaccessible. |
| 0x13 | NMTC Network Available | The Network connected to the DCM (port A/B) is accessible. |
| 0x14 | ALL NMTC Networks Unavailable | If all the connections off the DCM cards are inaccessible (port A and B) |
| 0x15 | ALL NMTC Cards Unavailable | If all the DCM cards are inaccessible |
| 0x16 | EROUTE is Removed | All NMTC cards have been deleted. |
| 0x17 | EROUTE System is Available | The EROUTE system is granting at a rate that does not exceed the threshold (80% of 1700 * N EROUTE cards). |
| 0x18 | EROUTE System Threshold Exceeded | The EROUTE system has reached a granting rate higher than its threshold. |
| 0x19 | EROUTE System Capacity Exceeded | The EROUTE system has reached a granting rate higher than its capacity (1700 grants per sec * N EROUTE cards). |
| 0x1A | EROUTE capacity normal, card(s) abnormal | The EROUTE system is granting at a rate that does not exceed the threshold (80% of 1700 * N EROUTE cards). However, one or more cards are OOS-MT. |
| 0x1B | NTP Time Unavailable | The NTP time is unavailable |
| 0x1C | NTP Time Available | The NTP time is available |
| 0x1D | Congestion: Copy Function De-activated | The Copy Function on the SS7 cards has been de-activated. |
| 0x1E | Copy Function Activated | The Copy Function on the SS7 cards has been activated. |
| 0x1F | Link not Monitored | This is a possible clearing condition for Congestion: Copy Function Deactivated. This implies that the NMP is not monitoring this Link any longer so any Monitoring alarms should be cleared. |
| 0x20 | Timestamp Invalid | LIM card's timestamp is invalid |
| 0x21 | Timestamp Valid | LIM card's timestamp is valid |
| 0x30 | SS7 Card Unavailable | SS7 link card is out-of-service. |
| 0x31 | SS7 Card Available | SS7 link card is in-service. |
| 0x32 | Clock A Failed | Routing node Clock A Failed |
| 0x33 | Clock A Normal | Routing node Clock A Normal |
| 0x34 | Clock B Failed | Routing node Clock B Failed |
| 0x35 | Clock B Normal | Routing node Clock A Normal |
| 0x36 | Clocks A and B Failed | Routing node Clocks A and B failed |
| 0x37 | Clocks A and B Normal | Routing node Clocks A and B Normal |
| 0x38 | LIM has been denied SCCP Service | The LIM cannot get service from an SCCP card |
| 0x39 | LIM has been denied NM Service | The LIM cannot get service from NMP |
| 0x3A | SS7 Link Available | Possible Clearing Condition for the following link alarms (0x3A to 0x61) (level = MAJOR). |
| 0x3B | Alarm cleared by deleting SLK | Possible Clearing Condition for the following link alarms (0x3A to 0x62) (level = MAJOR). |
| 0x3C | Too Many Interrupts | Indicates the link has had numerous interruptions |
| 0x3D | Lost Data | Signaling link has lost data |
| 0x3E | SUERM Threshold Exceeded | The signal unit error rate monitor (SUERM) has exceeded the threshold because there are too many alarms. |
| 0x3F | Lvl-2 T1 Expd (ready) | The signaling link did not receive a fill-in or message signal unit after the proving period. |
| 0x40 | Lvl-2 T1 Expd (not ready) | The signaling link did not receive a fill-in or message signal unit after the proving period. |
| 0x41 | Lvl-2 T3 Expired | The link did not receive an SIN or an SIE before the T3 timer expired |
| 0x42 | Lvl-2 T2 Expired | The link did not receive an SIN, SIE or SIOS |
| 0x43 | Failed Proving Period | The signaling link has failed the proving period |
| 0x44 | OSA - Received SIO | The signaling terminal has received the status indication Out of Alignment from the far end |
| 0x45 | OSA - Received SIN | The signaling terminal has received the status indication normal proving from the far end |
| 0x46 | OSA - Received SIE | The signaling terminal has received the status indication emergency alignment from the far end |
| 0x47 | OSA - Received SIOS | The signaling terminal has received the status indication Out of service from the far end |
| 0x48 | ABN - rcvd 2 of 3 invalid BSN | The link has received 2 out of 3 invalid backward sequence numbers (BSNs) from the far end. |
| 0x49 | ABN - rcvd 2 of 3 invalid FIB | The link has received 2 out of 3 invalid forward indicator bits (FIB) from the far end. |
| 0x4A | Remote congestion Timeout | The remote node has been in congestion too long. The T6 timer has timed out. |
| 0x4B | XDA - Excess acknowledge delay | The far end is taking too long to acknowledge the messages sent to it by the signaling terminal. The T7 timer has timed out. |
| 0x4C | COO - rcvd changeover order | The signaling link has received a changeover order from the far end. |
| 0x4D | False congestion restart | This message indicates the signaling link has entered a congested state even though the traffic on the linkset is not high enough to cause congestion. |
| 0x4E | MTP link restart delayed | Indicates that a link has gone in and out of service. |
| 0x4F | Remote FE Loopback | This message indicates that the specified link has been looped back from the far end. |
| 0x50 | Link Test Failed | Link Test Failed |
| 0x51 | Remote Blocked | The link is blocked due to an event at the far end |
| 0x52 | Local Blocked | The local technician has put the signaling link in processor outage. |
| 0x53 | Remote Inhibited | A craft person at the far end has remotely inhibited the link. |
| 0x54 | Local Inhibited | The link has been inhibited locally |
| 0x55 | Not Aligned | The link has lost alignment. It can not longer carry traffic. |
| 0x56 | LM Timer NO-CREDIT Expired | The remote node has held the local node in a no-credit state for too long. |
| 0x57 | XDA - Timer NO-RESPONSE expired | The far end is not responding to the outgoing POLL messages. |
| 0x58 | Local Processor Outage | Indicates a spontaneous or management initiated processor outage. |
| 0x59 | Rcvd SSCOP END - proc outage | The far end sent an "END processor outage" protocol data unit (PDU). |
| 0x5A | Rcvd SSCOP END - out of service | The far end sent an "END out of service" protocol data unit (PDU). |
| 0x5B | Rcvd SSCOP END - protocol error | A protocol error has occurred on the far end. |
| 0x5C | Rcvd SSCOP END - mcmnt initiated | The MAAL layer (not a user) on the far end released a link. |
| 0x5D | FAC - DS1 LOS failure | The level 1 facility outage: loss of signal |
| 0x5E | FAC - DS1 LOF failure | The level 1 facility outage: loss of frame |
| 0x5F | FAC - DS1 LCD failure | The level 1 facility outage: loss of cell delineation. |

TABLE 11-continued

Events and Corresponding Event Codes

| Code | Indication | Description |
|---|---|---|
| 0x60 | XER - ISERM Threshold Exceeded | The in service error rate monitor (ISERM) maintains a counter to estimate the PDU rate error rate. The ISERM counter exceeded the estimated threshold. |
| 0x61 | Remote NE Loopback | (Level = MAJOR) Indicates the link is in loopback |
| 0x62 | Remote NE Loopback Cleared | Indicates the link was in loopback and now the loopback has been de-activated. |
| 0x70 | Congestion Level 0 to 1 | MSU traffic on the link has reached congestion level 1. |
| 0x71 | Congestion Level 1 to 2 | MSU traffic on the link has reached congestion level 2. |
| 0x72 | Congestion Level 2 to 3 | MSU traffic on the link has reached congestion level 3. |
| 0x73 | Congestion Level 3 to 2 | The congestion has fallen to level 2. |
| 0x74 | Congestion Level 2 to 1 | The congestion has fallen to level 1. |
| 0x75 | Congestion has cleared | The congestion state of a link has been resolved. |
| 0x76 | Discard Level 0 to 1 | Messages with an SIO priority of 0 are being discarded. |
| 0x77 | Discard Level 1 to 2 | Messages with an SIO priority of 0 or 1 are being discarded. |
| 0x78 | Discard Level 2 to 3 | Messages with an SIO priority of 0, 1 or 2 are being discarded. |
| 0x79 | Discard Level 3 to 2 | Congestion is clearing and the level has fallen to level 2. |
| 0x7A | Discard Level 2 to 1 | Congestion is clearing and the level has fallen to level 1. |
| 0x7B | Discard has cleared | No messages are being discarded. Overflow has reached level 0. |
| 0x80 | SIO Received | SIO message received at L2 |
| 0x81 | SIO Transmitted | SIO message transmitted at L2 |
| 0x82 | SIN Received | SIN message received at L2 |
| 0x83 | SIN Transmitted | SIN message transmitted at L2 |
| 0x84 | SIE Received | SIE message received at L2 |
| 0x85 | SIE Transmitted | SIE message transmitted at L2 |
| 0x86 | SIOS Received | SIOS message received at L2 |
| 0x87 | SIOS Transmitted | SIOS message transmitted at L2 |
| 0x88 | SIPO Received | SIPO message received at L2 |
| 0x89 | SIPO Transmitted | SIPO message transmitted at L2 |
| 0x8A | SIB Received | SIB message received at L2 |
| 0x8B | SIB Transmitted | SIB message transmitted at L2 |
| 0x8C | FISU Received | FISU message received at L2 |
| 0x8D | FISU Transmitted | FISU message transmitted at L2 |
| 0x8E | No Data | No data being received at L2 |
| 0x90 | Out of Service sent | Out of Service event sent by SSCF |
| 0x91 | Out of Service received | Out of Service event Received by SSCF |
| 0x92 | Processor Outage sent | Processor Outage event sent by SSCF |
| 0x93 | Processor Outage received | Processor Outage event received by SSCF |
| 0x94 | In Service sent | In Service event sent by SSCF |
| 0x95 | In Service received | In Service event received by SSCF |
| 0x96 | Normal sent | Normal event sent by SSCF |
| 0x97 | Normal received | Normal event received by SSCF |
| 0x98 | Emergency sent | Emergency event sent by SSCF |
| 0x99 | Emergency received | Emergency event received by SSCF |
| 0x9A | Alignment Not Successful sent | Alignment Not Successful event sent by SSCF |
| 0x9B | Alignment not successful Rcvd. | Alignment not successful event Rcvd. By SSCF |
| 0x9C | Mgmt Initiated sent | Mgmt Initiated event sent by SSCF |
| 0x9D | Mgmt Initiated received | Mgmt Initiated event received by SSCF |
| 0x9E | Protocol Error sent | Protocol Error event sent by SSCF |
| 0x9F | Protocol Error received | Protocol Error event received by SSCF |
| 0xA0 | Proving Not Successful sent | Proving Not Successful event sent by SSCF |
| 0xA1 | Proving Not Successful received | Proving Not Successful event rcvd by SSCF |

Octet twenty in event message 1700 contains an event count. The event count indicates the number of times this same event was seen between the first occurrence (indicated by the timestamp value) and the generation of this event message.

Octets twenty-one and twenty-two in event message 1700 contain the event data length. The event data length indicates the length of the event data field that follows. The octets beginning from twenty-three to the length specified in the event message's event data length field contain event data. Event data may be any data used by an application to describe an event. For example, event data may include a text string, such as "link down" for communicating event information to a human operator.

As illustrated in FIG. 17, for efficiency purposes, event message 1700 may carry multiple events. In order to carry multiple events, the event information from the timestamp field to the event data field may be repeated.

Figure 18:
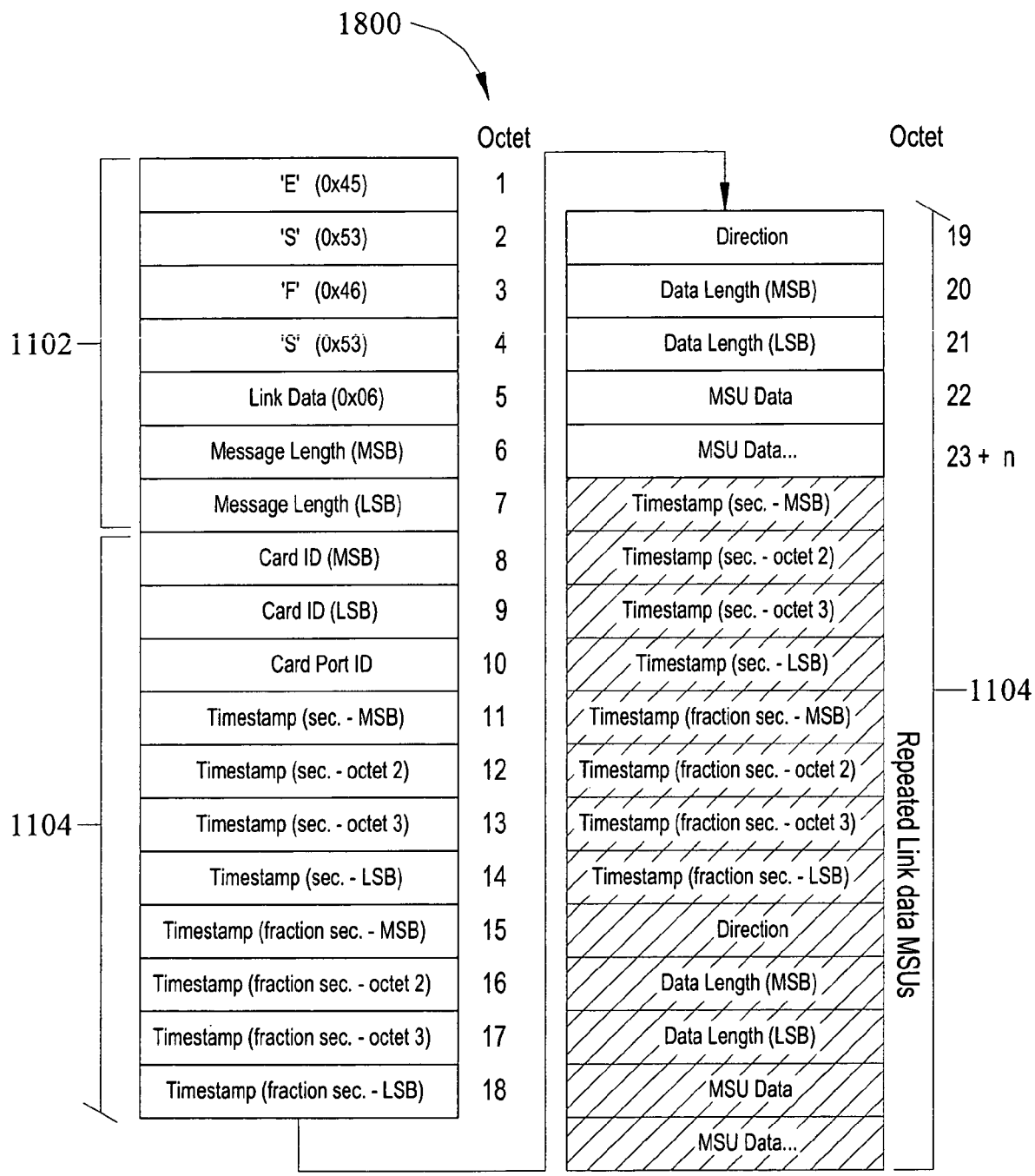
FIG. 18 is a message format diagram illustrating an exemplary format for a link data message suitable for use by embodiments of the present invention.

A link data message is used to carry link data from network monitoring client 610 to network monitoring processors. 106. FIG. 18 shown below illustrates an example of a link data message 1800 suitable for use by embodiments of the present invention. In FIG. 18, link data message 1800 includes a header portion 1102 and a data portion 1104. Header portion 1102 preferably includes a code (0x06) that identifies the message as a link data message. Data portion 1104 includes various fields for carrying link data, which will now be explained in more detail.

Octets eight and nine in the link data message 1800 contain a card ID. The card ID indicates the card in the routing node being monitored that sent the link data message. The card ID may be a slot identifier that indicates the particular slot in the routing node in which the card is located.

Octet ten in link data message 1800 contains a card port identifier. The card port identifier identifies the port on the routing node being monitored from which the link data was sent or received.

Octets eleven through eighteen in link data message 1800 contain a timestamp. The timestamp represents the time the MSU was received or transmitted by the routing node being monitored. The timestamp may be in any suitable format. For example, the timestamp may be in the Unix timespec format of thirty-two (32) bits for seconds since January 1, 1900 and thirty-two (32) bits for nanoseconds.

Octet nineteen in the link data message 1800 contains a direction value. The direction value indicates the traffic direction of the MSU when processed by the routing node being monitored. Table 12 shown below illustrates exemplary direction value codings that may be used.

TABLE 12

Direction Codes

| Coding | Indication |
|---|---|
| 0x01 | Transmitted by Routing Node |
| 0x02 | Received by Routing Node |

Octets twenty and twenty-one in link data message 1800 contain the data length. The data length octets indicate the length of the MSU data fields that follow. The octets beginning from twenty-two to the length specified in the link data message's data length field contain the MSU data. The MSU data may be stored in any suitable order, such as link wire order (i.e., it is transmitted as it was received) and contains the MSU fields BSN through SIF inclusive. Link data message 1800 may contain multiple MSUs. The actual MSU information, from the timestamp through the MSU Data, may be repeated.

Figure 19:
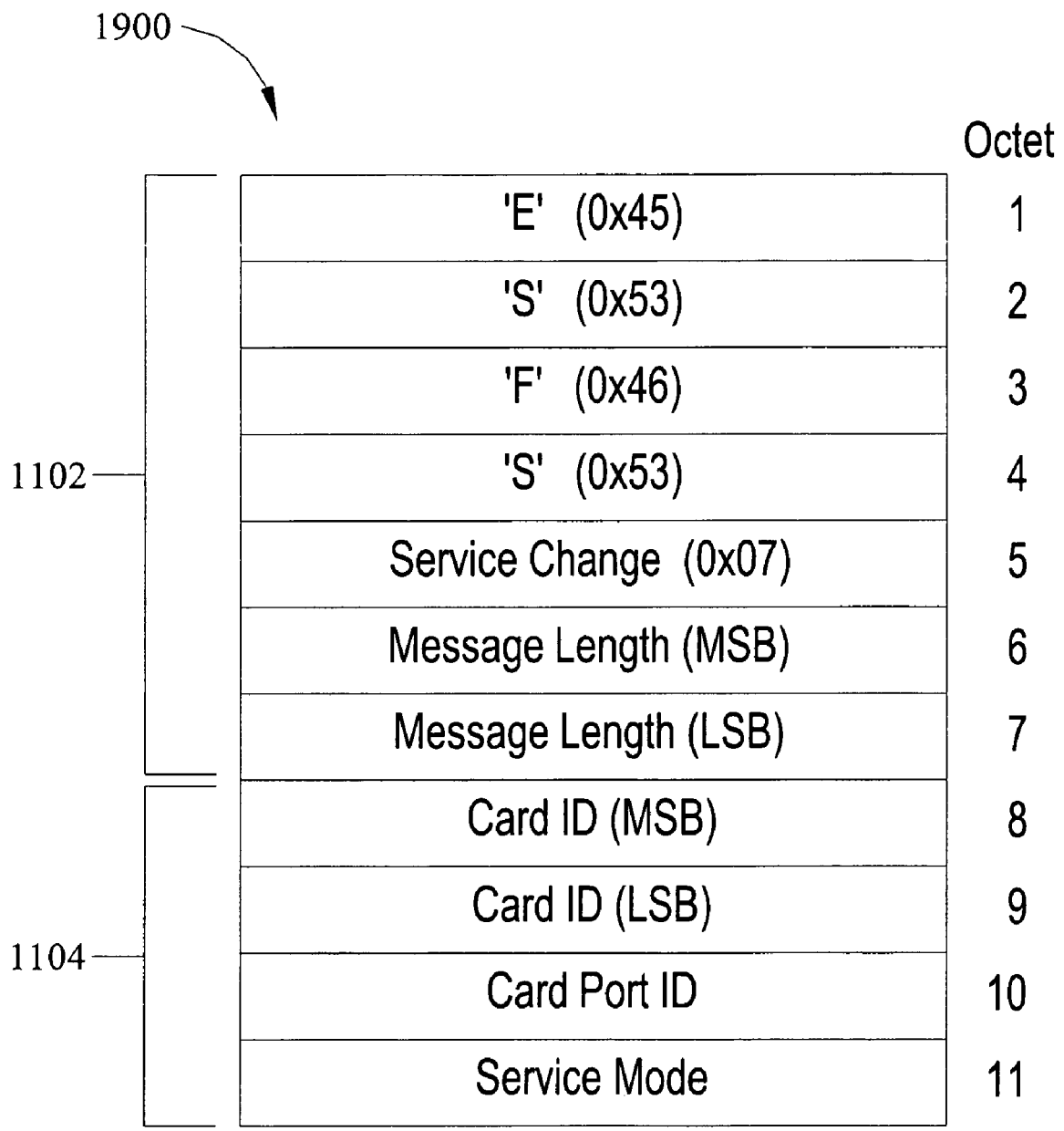
FIG. 19 is a message format diagram illustrating an exemplary format for a service change message suitable for use by embodiments of the present invention.

A service change message may be used by network monitoring processor 106 to alter the network monitoring service being provided. FIG. 19 illustrates an exemplary network monitoring service change message format suitable for use by embodiments of the present invention. In FIG. 19, service change message 1900 includes a header portion 1102 and a data portion 1104. Header portion 1102 preferably includes a value (0x07) that identifies the message as a service change message. Data portion 1104 includes various fields relating to changing network monitoring service, which will now be described in further detail.

Octets eight and nine in service change message 1900 contain the card ID. The card ID identifies the card in the routing node being monitored that the service change will affect. The card ID may be any suitable code that identifies the card. In one example, the card ID is a code that identifies the card slot in the routing node being monitored.

Octet ten in service change message 1900 contains a port identifier. The port identifier identifies the port on the routing node being monitored to which the service change applies.

Octet eleven in service change message 1900 contains the service mode. The service mode is used to indicate the new type of service granted by network monitoring processor 106. Table 9 illustrated above includes exemplary service modes and corresponding codings that may be used in the service mode field.

Network monitoring processor 106 may use service change message 1900 to dynamically change the network monitoring service being provided. For example, network monitoring processor 106 may send a first service change message to start the flow of MSUs and a second service change message to end the flow of MSUs. In another example, network monitoring processor 106 may send a service change message to change the network monitoring service being provided from MSU copy service to alarm service or vice versa. In yet another example, network monitoring processor 106 may send a service change message to change the flow of MSUs to transmitted only MSUs or received only MSUs. Thus, service change message 1900 allows an operator or any application to modify on the fly the type of network monitoring service being provided.

Thus, FIGS. 11-19 illustrate that the network monitoring communications protocol according to the present invention includes a plurality of message types, each having a specific network monitoring function. These message types greatly decrease the time required to configure or change network monitoring service when the configuration of a network or routing node being monitored changes. As a result, network monitoring efficiency is increased.

Exemplary Network Deployment

Figure 20:
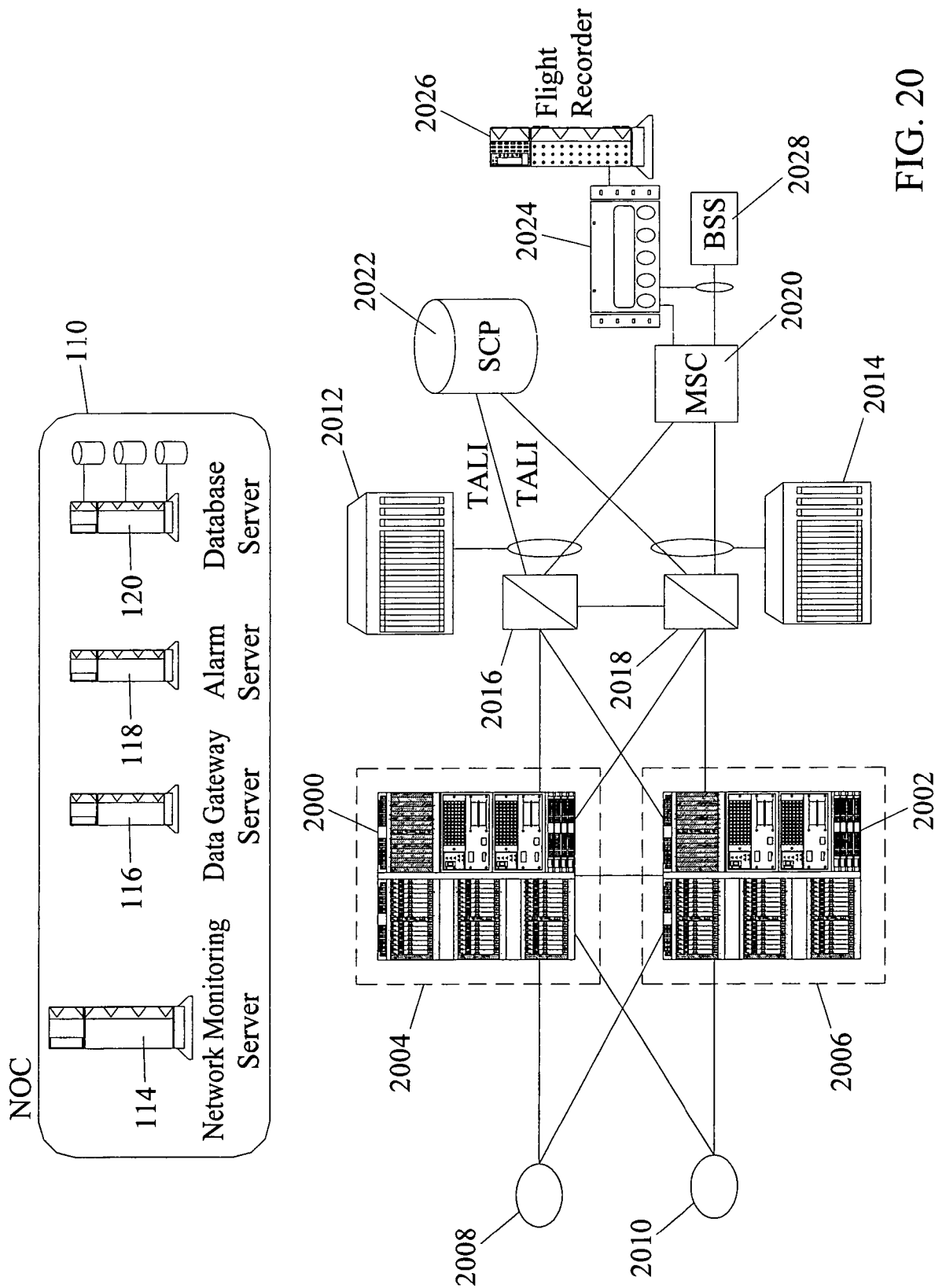
FIG. 20 is a network diagram illustrating exemplary deployment of an automatically configurable network monitoring system according to an embodiment of the present invention.

An automatically configurable network monitoring system according to an embodiment of the present invention may be deployed at various locations in a telecommunications signaling network to monitor signaling messages. FIG. 20 illustrates exemplary locations in a signaling network in which an automatically configurable network monitoring system according to the present invention may be deployed. In FIG. 20, completely probeless automatically configurable network monitoring systems 2000 and 2002 are deployed at STPs 2004 and 2006 to monitoring signaling links between STPs 2004 and 2006 and SSPs 2008 and 2010. In this example, automatically configurable network monitoring systems 2000 and 2002 emulate probe-based systems. However, as described above with respect to FIGS. 3-5, external link probes are not required because network monitoring system hardware may be located in the same shelf or in an adjacent shelf as each signal transfer point and connected directly to the signal transfer point. A terminal(not shown) may also be included to provide operator access to probeless automatically configurable network monitoring systems 2000 and 2002.

Probeless automatically configurable network monitoring systems 2000 and 2002 may be used with one or more probe-based network monitoring systems. In FIG. 20, probe-based network monitoring units 2012 and 2014 and associated data recorders (not shown) may be deployed at STPs 2022 and 2024 to monitor messages sent between STPs 2016 and 2018 and MSC 2020 and SCP 2022. An exemplary hardware platform suitable for use as probe-based network monitoring units 2012 and 2014 is the i3000 or i2000 available from Tekelec of Calabasas, Calif. The associated data recorders may be implemented using Unix-based workstations, such as SUN servers.

An additional probe-based network monitoring unit 2024 and associated data recorder 2026 may be included to record data transmitted between MSC 2020 and base station 2028. An exemplary hardware platform suitable for use as probe-based network monitoring system 2024 is the i2000 available from Tekelec of Calabasas, Calif.

As described above with respect to FIG. 1, automatically configurable network monitoring systems 2000 and 2002 may communicate with one or more network monitoring applications to provide various network monitoring services. In FIG. 20, network monitoring systems 2000, 2002, 2012, 2014, and 2024 communicate with server farm 110, which may be located at a network operations center (NOC). As stated above with regard to FIG. 1, server farm 110 includes a network monitoring server 114, a data gateway server 116, an alarm server 118, and a database server 120. Network monitoring server 114 performs the following functions: real time signaling link status reporting, real time signaling link state reporting, real time protocol analysis, such as call tracing, filtering, and decoding, traffic report generation, and real time event reporting. Data gateway server 116 receives MSU fragments, formats the MSU fragments into CDRs and sends the CDRs to applications, such as fraud detection applications, billing verification applications, etc. Alarm server 118 collects event message reports and other events that report signaling link errors and displays alarms to the user. Database server 120 is connected to network monitoring server 114. Network monitoring server 114 generates canned traffic reports in flat ASCII format. Some end users may desire to generate customized traffic reports. Hence, database server 120 stores the data collected by network monitoring server 114 in a database, such as an Oracle database. A database front end, such as Crystal Reports available from Seagate Software may be used along with database server 120 to generated customized reports. Server farm 110 may be located at a network operations center or a telecommunications administration center for performing network operation and administration functions based on data provided by the network monitoring systems illustrated in FIG. 20.

Thus, as illustrated in FIG. 20, a probeless automatically configurable network monitoring system may be deployed in conjunction with probe-based systems to provide a complete view of the network being monitored. In addition, the automatically configurable network monitoring system according to the present invention may emulate conventional probe-based systems by replacing conventional probe-based systems at an STP and copying MSUs from signaling links previously monitored by probe-based systems. Finally, because the automatically configurable network monitoring systems according to the present invention can be configured and altered automatically using the network monitoring communications protocol described herein, the need for skilled network monitoring personnel at the network monitoring site is reduced.

It will be understood that various details of the invention may be changed without departing from the scope of the invention. Furthermore, the foregoing description is for the purpose of illustration only, and not for the purpose of limitation—the invention being defined by the claims.

What is claimed is:

1. A computer-implemented network monitoring communications protocol for communicating network monitoring messages between a routing node being monitored and a network monitoring processor, the computer-implemented communications protocol comprising:
    (a) computer code adapted to execute on a network routing node for automatically sending network monitoring service request messages to a network monitoring processor; and
    (b) computer code adapted to execute on a network monitoring processor for receiving service request messages and formulating service response messages for granting or denying network monitoring service requests based on the service request messages, wherein, in response to receiving a response message granting network monitoring service, the computer code on the routing node establishes a connection with a network monitoring processor that sent the response message and begins sending signaling message copies to the network monitoring processor over the connection.

2. The computer-implemented network monitoring communications protocol of claim 1 wherein the service request messages each include a header portion for identifying the message as a service request message and a data portion containing signaling link information regarding the signaling link for which network monitoring service is being requested.

3. The computer-implemented network monitoring communications protocol of claim 1 wherein the computer code adapted to execute on the network monitoring processor includes computer-executable instructions for formulating a service accept message in response to granting a service request, the service accept message including a header portion for identifying the message as a service accept message and a data portion including a network address of a network monitoring service providing entity.

4. The computer-implemented network monitoring communications protocol of claim 1 wherein the computer code adapted to execute on the network monitoring processor includes computer-executable instructions for formulating a service reject message in response to denying a service request, the service reject message including a header portion for identifying the message as a service reject message and a data portion including a code indicating a reason for denying the service request.

5. The computer-implemented network monitoring communications protocol of claim 4 wherein the computer code adapted to execute on the routing node includes computer-executable instructions for formulating a provisioning information message in response to receiving a service accept message, the provisioning information message including a header portion for identifying the message as a provisioning information message and a data portion for communication signaling link provisioning information to the network monitoring processor.

6. The computer-implemented network monitoring communications protocol of claim 1 wherein the computer code adapted to execute on the routing node includes computer-executable instructions for formulating and sending an event message to the network monitoring processor, the event message including a header portion for identifying the message as an event message and a data portion for communicating event information to the network monitoring processor.

7. The computer-implemented network monitoring communications protocol of claim 1 wherein the computer code adapted to execute on the routing node includes computer-executable instructions for formulating and sending a link data message, the link data message including a header portion for identifying the message as a link data message and a data portion for carrying the signaling message copies to the network monitoring processor.

8. The computer-implemented network monitoring communications protocol of claim 1 wherein the computer code adapted to execute on the network monitoring processor includes computer-executable instructions for formulating and sending a service change message, the service change message including a header portion for identifying the message as a service change message and a data portion for storing information for changing the type of network monitoring service being provided.

9. The computer-implemented network monitoring communications protocol of claim 1 wherein the computer code adapted to execute on the network monitoring processor and the computer code adapted to execute on the routing node each include computer executable instructions for sending formulating and sending heartbeat messages at predetermined time intervals.

10. The computer-implemented network monitoring communications protocol of claim 9 wherein the computer code adapted to execute on the network monitoring processor and the computer code adapted to execute on the routing node each include computer instructions for closing network monitoring sessions in response to failing to receive heartbeat messages from a peer node within a predetermined time period.

* * * * *